United States Patent [19]
Abe et al.

[11] Patent Number: 6,002,661
[45] Date of Patent: Dec. 14, 1999

[54] DEFORMABLE MIRROR AND OPTICAL DATA REPRODUCING APPARATUS USING THE SAME

[75] Inventors: Shingo Abe, Tenri; Tetsuya Inui, Nara; Hirotsugu Matoba, Sakurai; Susumu Hirata, Ikoma-gun; Yorishige Ishii, Yamatotakada; Kuniaki Okada; Hideaki Fujita, both of Tenri, all of Japan

[73] Assignee: Sharp Kabushiki Kaisha, Osaka, Japan

[21] Appl. No.: 08/991,660

[22] Filed: Dec. 16, 1997

[30] Foreign Application Priority Data

Dec. 26, 1996 [JP] Japan .................................. 8-348427

[51] Int. Cl.$^6$ ........................................ G11B 7/00
[52] U.S. Cl. ..................... 369/112; 369/44.23; 369/58
[58] Field of Search ................. 369/112, 44.23, 369/58, 44.22, 44.17, 44.14, 110; 359/846, 847

[56] References Cited

U.S. PATENT DOCUMENTS 5,202,875  4/1993  Rosen et al. .
5,719,846  2/1998  Matoba et al. ........................ 369/112
5,880,896  3/1999  Ishii et al. ........................... 359/846

FOREIGN PATENT DOCUMENTS 5-151591  6/1993  Japan .

Primary Examiner—Thang V. Tran

[57] ABSTRACT

A deformable mirror includes a first base plate having a first reference surface, a transparent second base plate having a second reference surface opposed to the first reference surface, a flexible member disposed between the first base plate and the second base plate and having a reflective surface on a surface thereof, the flexible member being adapted to be fitted on the first reference surface or on the second reference surface, and a driver for fitting the flexible member on the first reference surface or on the second reference surface, wherein the flexible member is held between the first base plate and the second base plate, and the light rays to be reflected by the reflective surface are imparted with the first degree of spherical aberration or with the second degree of spherical aberration by fitting the flexible member on the first reference surface or on the second reference surface by the driver.

13 Claims, 18 Drawing Sheets

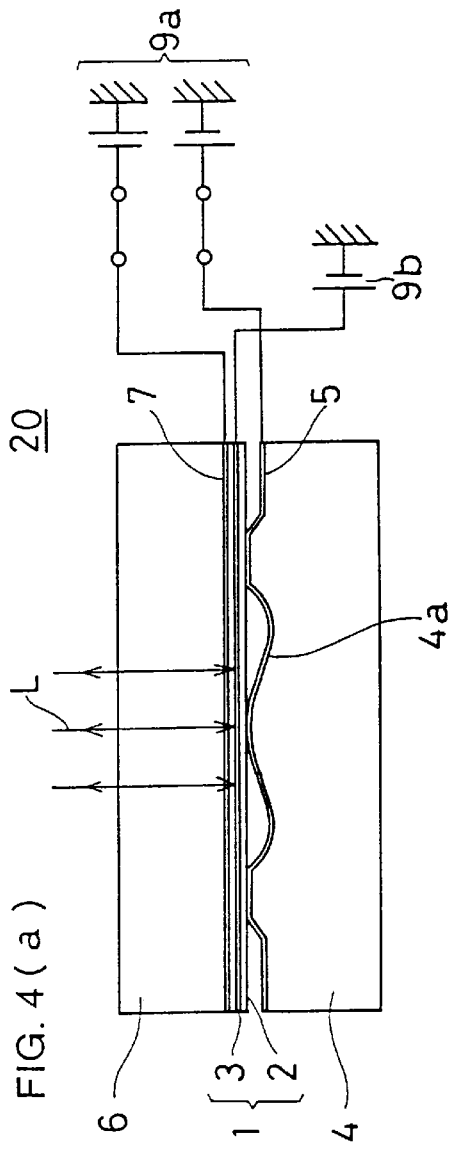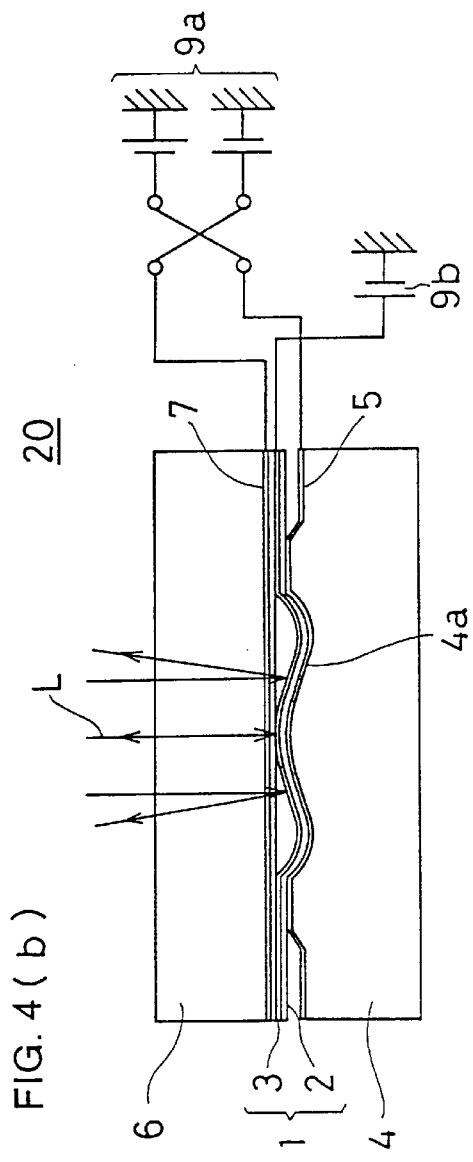

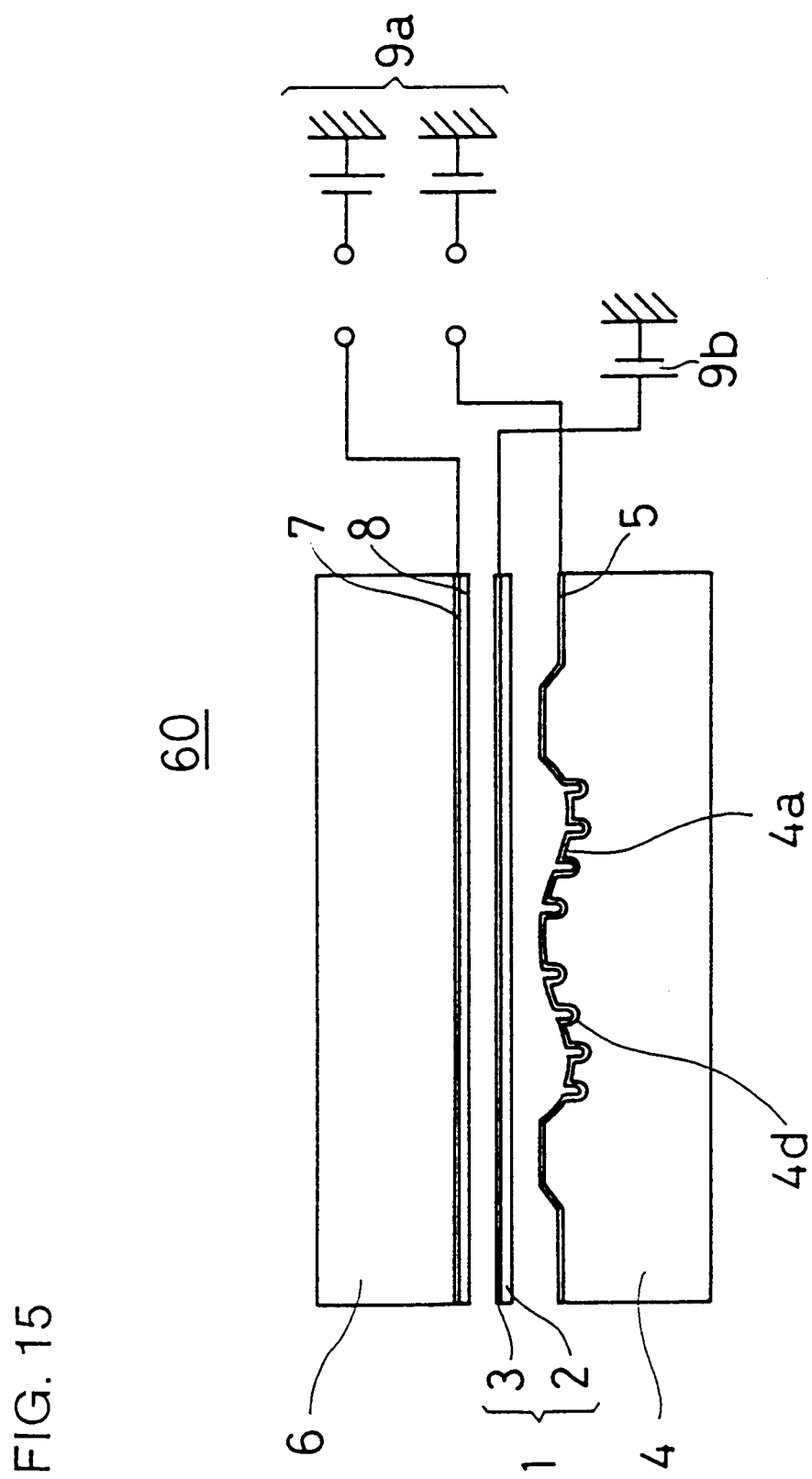

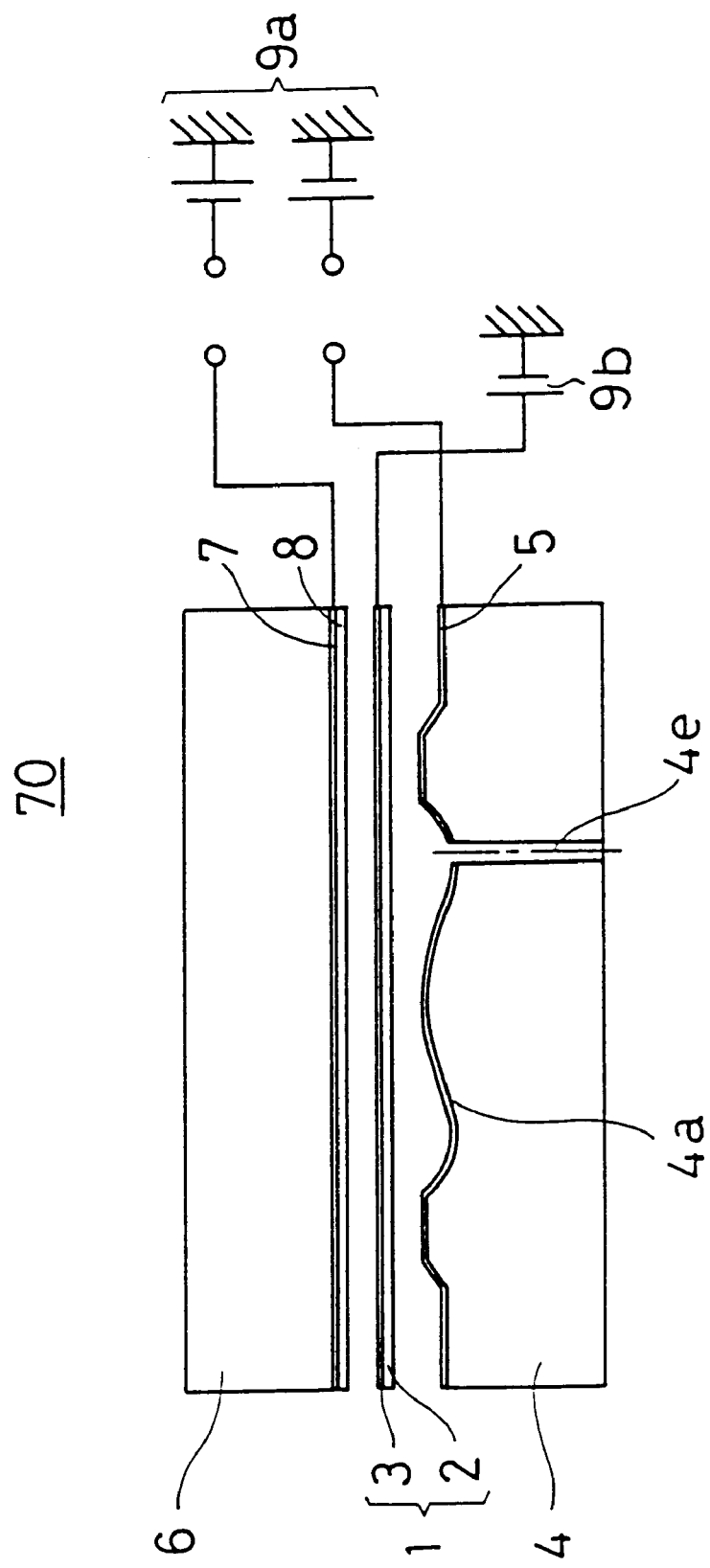

DEFORMABLE MIRROR AND OPTICAL DATA REPRODUCING APPARATUS USING THE SAME

CROSS-REFERENCES TO RELATED APPLICATIONS

This application is related to Japanese Patent Application No. Hei 8(1996)-348427, filed on Dec. 26, 1996 whose priority is claimed under 35 USC § 119, the disclosure of which is incorporated herein by reference in its entirety.

BACKGROUND OF THE INVENTION

1. Field of the Invention

The present invention relates to a deformable mirror for an aberration corrector which is used for light pick-up for reproducing data from any of optical data recording media such as optical disks having thickness variations and adapted to correct spherical aberration of the mirror for correctly focusing light rays on a data recorded surface of an optical disk. Further, the invention relates to an optical data reproducing apparatus using the deformable mirror.

2. Description of the Related Art

Digital versatile disks (DVDs) have been receiving attentions as a new type of optical data recording media. Since the DVDs are designed to record data at a higher density than the conventional CDs, various modifications have been made to the DVDs themselves and to optical systems of optical data reproducing apparatuses.

When data are to be reproduced from a CD by means of a data reproducing apparatus designed for the DVDs, defocusing occurs due to a difference in thickness between the CD and the DVD (DVD: 0.6 mm, CD: 1.2 mm), making it difficult to obtain high quality data reproducing signals. To cope with this problem, an defocusing correction function should be incorporated in the optical system of the data reproducing apparatus.

Typical aberration correctors for correcting the defocusing are disclosed in Japanese Unexamined Patent Publication No. Hei 5(1993)-151591 and the like. One exemplary aberration corrector is shown in FIG. 21. The aberration corrector 630 has a pair of complementary triangular blocks 632 and 634. The block 634 is attached to a voice coil motor 636 and slidable on a surface of the block 632. The total thickness of the blocks through which light beam 602 passes can be controlled by moving the block 634 relative to the block 632, thereby controlling aberration to be imparted to the light beam 602. In FIG. 21, there are also shown a condenser lens 610 and a disk 612 from which data are reproduced.

Another exemplary aberration corrector is shown in FIG. 22. The aberration corrector 720 has a polarization beam splitter 722, a quarter-wave plate 724, and an electrically controllable deformable mirror 726. Light beam 702 incident to the polarization beam splitter 722 passes through the quarter-wave plate 724, and is subjected to spherical aberration control by the deformable mirror 726. The light beam again passes through the quarter-wave plate 724, and then is guided in a direction perpendicular to the incident direction thereof by the polarization beam splitter 722.

More specifically, the electrically controllable deformable mirror 726 includes, as shown in FIG. 23, a deformable plate 801 having a mirror face 800 on its surface, piezoelectric actuators 802 for pressing the deformable plate 801 from the back side thereof at several points, and a base plate 803 on which the deformable plate 801 and the piezoelectric actuators 802 are fixed.

By variably controlling voltages to be applied to the respective piezoelectric actuators 802, the deformable plate 801 is deformed by a desired degree, so that the mirror face 800 on the deformable plate 801 can be deformed into a desired configuration. Thus, the spherical aberration to be imparted to the light beam 702 can be controlled when the light beam 702 is reflected on the mirror face 800.

However, these aberration correctors have the following drawbacks. The aberration corrector 630 shown in FIG. 21 employs the voice coil motor 636 for the aberration control and, therefore, is not advantageous in the size reduction and energy saving of an optical data reproducing apparatus.

The aberration corrector 720 shown in FIGS. 22 and 23 is constructed such that the piezoelectric actuators 802 press the deformation plate 801 from the back side thereof at the several points. Therefore, the mirror face 800 is not necessarily deformed in a desired configuration because of environmental influences such as vibrations and a temperature change. Since the light beam 702 to be used in an optical data reproducing apparatus typically has a diameter of about 4 mm, a multiplicity of piezoelectric actuators 802 should be provided within a 4 mm diameter area to precisely deform the deformable plate 801 in the desired configuration. This complicates the construction and assembly of the aberration corrector. In addition, the size of the deformable mirror 726 is increased because the multiplicity of the piezoelectric actuators 802 should be accommodated therein and connected to interconnection lines. Therefore, the aberration corrector 720 is not advantageous in the size reduction of a light pick-up device.

SUMMARY OF THE INVENTION

The present invention provides a deformable mirror for use in an aberration corrector, which is insusceptible to environmental influences such as vibrations and a temperature change and features a simplified construction, easier assembly, a reduced size and energy saving. The invention also provides a method of fabricating the deformable mirror. Further, the invention provides an optical data reproducing apparatus which employs the deformable mirror and is adapted for data reproduction from two kinds of optical disks having different thicknesses, featuring a reduced size and a simplified construction.

The deformable mirror according to the present invention comprises: a first base plate having a first reference surface capable of imparting incident light rays with a first degree of spherical aberration; a transparent second base plate having a second reference surface opposed to the first reference surface and capable of imparting the incident light rays with a second degree of spherical aberration which is different from the first degree of spherical aberration; a flexible member disposed between the first base plate and the second base plate and having a reflective surface on its surface, the flexible member being adapted to be fitted on the first reference surface or on the second reference surface; and a driver for fitting the flexible member on the first reference surface or on the second reference surface, wherein the flexible member is held between the first base plate and the second base plate, and the light rays to be reflected by the reflective surface are imparted with the first degree of spherical aberration or with the second degree of spherical aberration by fitting the flexible member on the first reference surface or on the second reference surface by the driver.

In brief, the deformable mirror of the present invention comprises the first base plate, the transparent second base plate, the flexible member having the reflective surface on its surface, and the driver for fitting the flexible member on the first reference surface or on the second reference surface.

The first base plate is formed with the first reference surface which is capable of imparting the incident light rays with the first degree of spherical aberration, whereas the second base plate is formed with the second reference surface which is capable of imparting the incident light rays with the second degree of spherical aberration different from the first degree of spherical aberration. The first and second base plates are disposed in such a manner that the first reference surface is opposed to the second reference surface.

The flexible member is held between the first base plate and the second base plate, and adapted to be deformed by the driver so as to be fitted on the first reference surface or on the second reference surface.

As a result, the reflective surface of the flexible member is deformed to be fitted on the first reference surface or on the second reference surface thereby to impart the light rays to be reflected on the reflective surface with the first degree of spherical aberration according to the first reference surface or with the second degree of spherical aberration according to the second reference surface. Thus, the spherical aberration to be imparted to the light rays can be changed by shifting the flexible member between the first reference surface and the second reference surface.

BRIEF DESCRIPTION OF THE DRAWINGS

FIGS. 4(a) and 4(b) are schematic diagrams for explaining a driving method for the deformable mirror according to Embodiment 2;

FIG. 15 is a schematic diagram illustrating the construction of a deformable mirror according to Embodiment 6 of the present invention;

FIG. 16 is a schematic diagram illustrating the construction of a deformable mirror according to Embodiment 7 of the present invention;

DETAILED DESCRIPTION OF THE PREFERRED EMBODIMENTS

Figure 1:
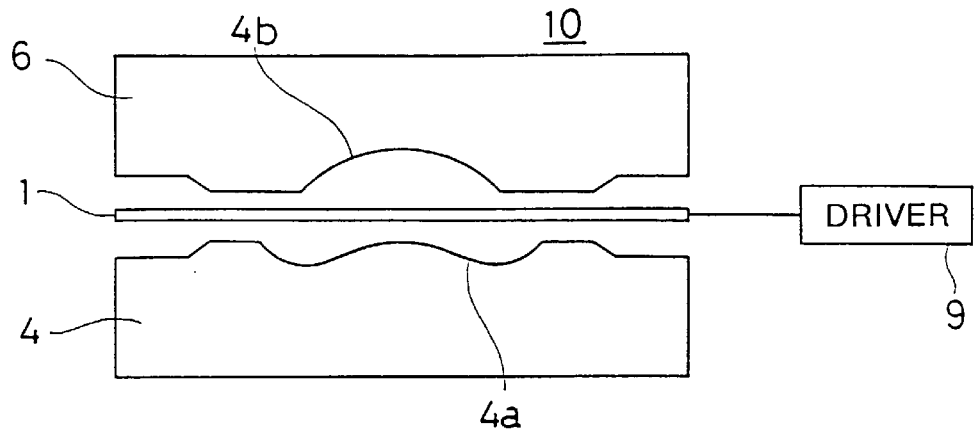
FIG. 1 is a schematic diagram illustrating the construction of a deformable mirror according to Embodiment 1 of the present invention.

The deformable mirror of the present invention comprises a first base plate, a second base plate, a flexible member and a driver.

Exemplary materials for the first base plate include glass and metals which can be polished to a mirror-smooth state. The first base plate has a first reference surface on its surface. The first reference surface is a curved surface which is capable of imparting incident light rays with a first degree of spherical aberration and reflecting the light rays. The formation of the curved surface is achieved by a conventionally known method.

The second base plate is of any of transparent materials such as glass and PMMA (polymethyl methacrylate). The second base plate has a second reference surface on its surface. The second reference surface is a curved surface which is capable of imparting the incident light rays with a second degree of spherical aberration different from the first degree of spherical aberration and reflecting the light rays. Like the first reference surface, the curved surface for the second reference surface can be formed by a conventionally known method.

The flexible member has a reflective surface which is capable of reflecting light rays thereon. The flexible member is held between the first base plate and the second base plate.

The driver may be any of various driving devices which are capable of fitting the flexible member on the first reference surface and on the second reference surface. For example, the driver utilizes any of various driving forces such as an electrostatic force, an electromagnetic force and a suction force by a pump.

In the deformable mirror, the first reference surface of the first base plate includes two kinds of curved surfaces: a first curved surface which is capable of imparting light rays with the spherical aberration; and a second curved surface which is capable of reflecting light rays outward at greater reflection angles. When the flexible member is fitted on the first reference surface, light rays incident on a central portion of the reflective surface are imparted with the spherical aberration by the first curved surface, and unnecessary light rays incident on a peripheral portion of the reflective surface are reflected outward at greater reflection angles by the second curved surface.

In the deformable mirror, the flexible member is held between the first base plate and the second base plate preferably with a tension applied thereto.

To this end, the flexible member is formed of a material having a greater linear expansion coefficient than the first base plate and the second base plate, so that the flexible member can be tensed by thermal stress when combined with the first and second base plates. The flexible member is bonded to the first and second base plates as being held therebetween at a temperature higher than room temperature with a thermosetting adhesive having a curing temperature higher than room temperature.

Alternatively, the flexible member may be held between the first and second base plates in vacuum, so that the flexible member can firmly be fitted with the first and second base plates by atmospheric pressure.

Further, the flexible member may be bonded to the first and second base plates as being held therebetween by an anodic bonding method. More specifically, joint faces of the flexible member and the first base plate or joint faces of the second base plate and the flexible member are respectively formed of a glass and a metal, and a voltage is applied between the glass joint face and the metal joint face to anodically bond the glass joint face and the metal joint face.

The present invention also provides an optical data reproducing apparatus. The optical data reproducing apparatus comprises: a light source; an aberration corrector for reflecting light rays from the light source to impart the light rays with predetermined spherical aberration; a condenser for focusing the light rays reflected by the aberration corrector on an optical disk; a light detector for detecting the light rays reflected from the optical disk; a signal processor for processing the detected light rays as optical signals; a disk detector for sensing the type of the optical disk and outputting a detection signal indicative of the type of the optical disk; and a controller for receiving the detection signal indicative of the type of the optical disk from the disk detector, the aberration corrector including the aforesaid deformable mirror, the controller being adapted to control the driver of the deformable mirror in accordance with the detection signal from the disk detector thereby to impart the light rays from the light source with the spherical aberration in accordance with the type of the optical disk.

With reference to the attached drawings, the present invention will hereinafter be described by way of embodiments. It should be noted that the invention be not limited to these embodiments.

Embodiment 1

FIG. 1 is a schematic diagram illustrating the construction of a deformable mirror according to Embodiment 1 of the present invention. As shown, the deformable mirror 10 according to this embodiment comprises a flexible member 1, a first base plate 4 located on the lower side in FIG. 1, a second base plate 6 located on the upper side in FIG. 1, and a driver 9 as the driving device. Usable as the driver 9 is a device capable of generating a driving force such as an electrostatic force or an electromagnetic force, which will be described later in detail.

The flexible member 1 is resiliently deformable, and has a reflective surface for reflecting incident light rays on its surface. The first base plate 4 has a first reference surface 4a which is capable of imparting the incident light rays with a first degree of spherical aberration when the flexible member 1 is fitted on the first reference surface 4a. The second base plate 6 is formed of a transparent material, and has a second reference surface 4b which is capable of imparting the incident light rays with a second degree of spherical aberration when the flexible member 1 is fitted on the second reference surface 4b. The first and second reference surfaces 4a and 4b have different curvature radii. The flexible member 1 is adapted to be fitted either on the first reference surface 4a or on the second reference surface 4b by switching the driving force to be applied to the flexible member 1 by the driver 9.

Figure 2A:
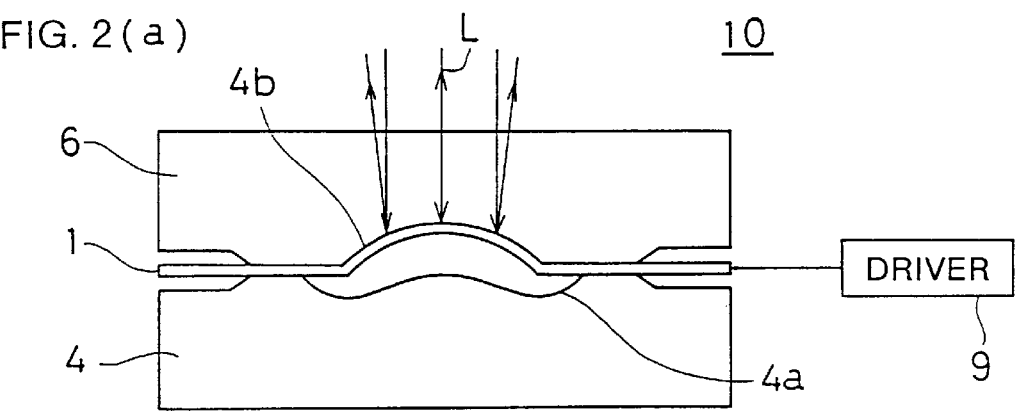
FIGS. 2(a) and 2(b) are schematic diagrams illustrating fitting states of a flexible member in accordance with Embodiment 1.
Figure 2B:
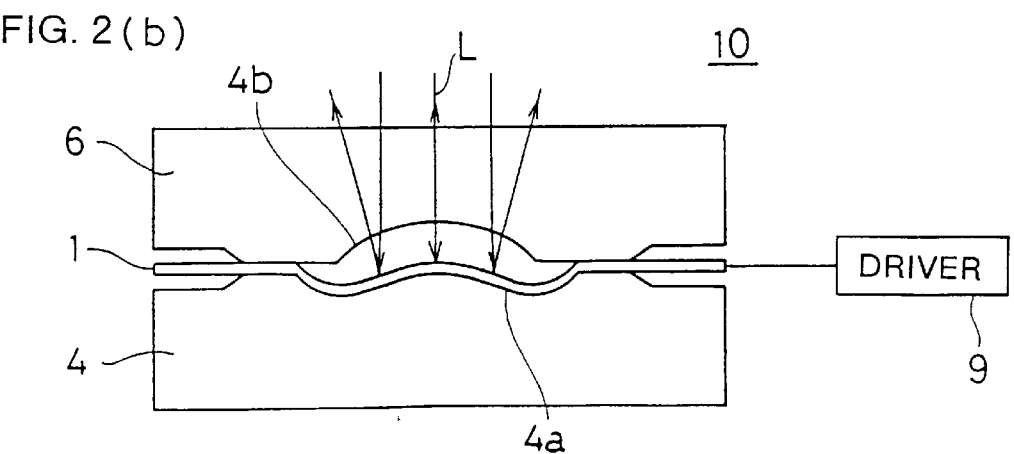

FIGS. 2(a) and 2(b) are schematic diagrams illustrating fitting states of the flexible member. As shown, the deformable mirror 10 can selectively impart the first degree of spherical aberration or the second degree of spherical aberration to the light rays.

FIG. 2(a) illustrates a state where the flexible member 1 is fitted on the second reference surface 4b by the driver 9. At this time, the incident light rays L are reflected on the second reference surface 4b while being imparted with the second degree of spherical aberration according to the curved surface of the second reference surface 4b.

FIG. 2(b) illustrates a state where the flexible member 1 is fitted on the first reference surface 4a by the driver 9. At this time, the incident light rays L are reflected on the first reference surface 4a while being imparted with the first degree of spherical aberration according to the curved surface of the first reference surface 4a. That is, the spherical aberration imparted to the light rays is different from that in the case shown in FIG. 2(a).

Thus, the spherical aberration to be imparted to the light rays L can be changed simply by selectively fitting the flexible member 1 on the first reference surface or on the second reference surface. Since the deformable mirror 10 is constructed such that the flexible member 1 is fitted either on the first reference surface or on the second reference surface, the flexible member 1 is not deformed undesirably by environmental influences such as vibrations and a temperature change. Further, the deformable mirror 10 is simple in construction and easy in assembly, because the flexible member 1 is simply held between the first and second base plates 4 and 6. In addition, the transparent second base plate 6 serves as a concave lens and, therefore, the curvature radius of the first reference surface 4a can be reduced so that a gap formed between the flexible member 1 and the first reference surface 4a can be reduced. This reduces an energy required for fitting the flexible member 1 on the first reference surface 4a when the spherical aberration is imparted to the light rays L by the first reference surface 4a.

Embodiment 2

Figure 3:
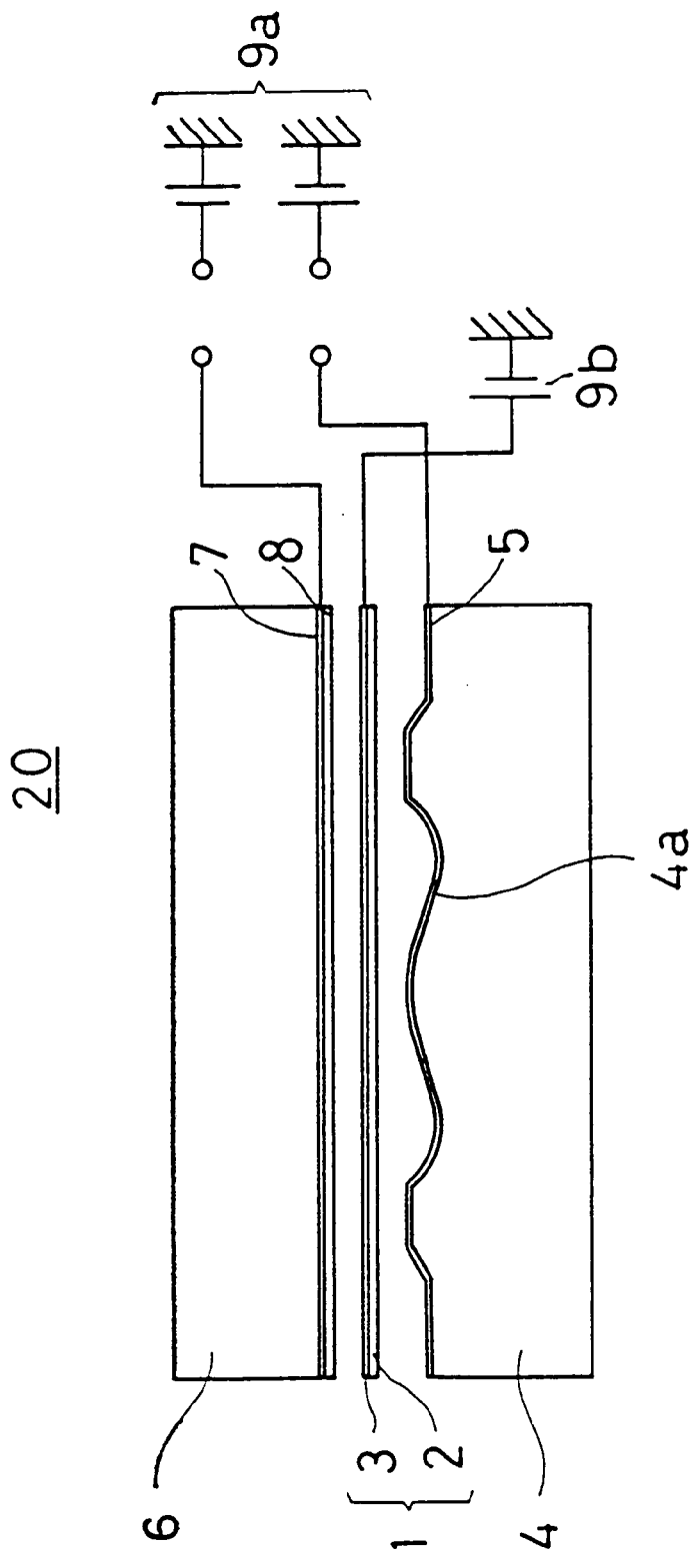
FIG. 3 is a schematic diagram illustrating the construction of a deformable mirror according to Embodiment 2 of the present invention.

FIG. 3 is a schematic diagram illustrating the construction of a deformable mirror according to Embodiment 2 of the present invention. In this embodiment, the second base plate 6 located on the upper side in FIG. 3 is not formed with the reference surface 4b, but is a planar base plate. It is not critical which of the first base plate 4 and the second base plate 6 is the planar base plate. In this embodiment, a device adapted to generate an electrostatic force for the shifting of the flexible member 1 is employed as the driver 9.

More specifically, the deformable mirror 20 according to this embodiment includes a flexible member 1, a base plate 4, a planar base plate 6, a control power source 9a for the base plates, and a power source 9b for the flexible member.

The flexible member 1 includes a resiliently deformable insulating film 2 and an electrode 3. The electrode 3 also serves as a reflective surface. The base plate 4 has a reference surface 4a which is capable of imparting incident light rays with spherical aberration when the flexible member 1 is fitted on the reference surface 4a, and has an electrode 5 on its surface. The planar base plate 6 is formed of a transparent material, and has a transparent electrode 7 and a transparent insulating layer 8 on its surface.

The electrode 3 is connected to the power source 9b, and a positive voltage is constantly applied to the electrode 3. The electrodes 5 and 7 are connected to the control power source 9a, which controls application of positive and negative voltages.

The deformable mirror 20 according to this embodiment has the same advantages as the deformable mirror 10 according to Embodiment 1. In addition, the deformable mirror 20 is advantageous in the size reduction and energy saving of an optical apparatus, because the flexible member can selectively be fitted either on the reference surface or on the planar surface by utilizing an electrostatic force generated by the application of a voltage, not by utilizing a motor, to selectively impart the spherical aberration to light rays.

Unlike the deformable mirror 10 according to Embodiment 1, one of the base plates is planar. This obviates the need for formation of a curved reference surface which requires a high machining accuracy, thereby reducing the costs.

FIGS. 4(a) and 4(b) are schematic diagrams for explaining a driving method for the deformable mirror 20. FIG. 4(a) illustrates a state where a positive voltage and a negative voltage are applied to the electrode 5 and the electrode 7, respectively, by the control power source 9a. At this time, a repulsive force is generated between the electrode 3 and the electrode 5 by an electrostatic force because of the constant application of the positive voltage to the electrode 3, whereas an attractive force is generated between the electrode 3 and the electrode 7. Therefore, the flexible member 1 is attracted to the planar base plate 6 so as to be fitted thereon.

FIG. 4(b) illustrates a state where a negative voltage and a positive voltage are applied to the electrode 5 and the electrode 7, respectively, by the control power source 9a. At this time, an attractive force is generated between the electrode 3 and the electrode 5, whereas a repulsive force is generated between the electrode 3 and the electrode 7. Therefore, the flexible member 1 is attracted to the base plate 4 so as to be fitted thereon.

The flexible member 1 can selectively be fitted on the reference surface 4a of the base plate 4 or on the planar surface of the planar base plate 6 by controlling the application of positive and negative voltages by means of the control power source 9a. Thus, the shape of the reflective surface of the flexible member 1 is changed to selectively impart the spherical aberration to the light rays L.

In this embodiment, both the attractive force and the repulsive force are exerted on the flexible member 1 by applying voltages to the electrodes 5 and 7. Alternatively, either the attractive force or the repulsive force may be exerted on the flexible member 1 by applying a voltage to either one of the electrodes 5 and 7.

Figure 5A:
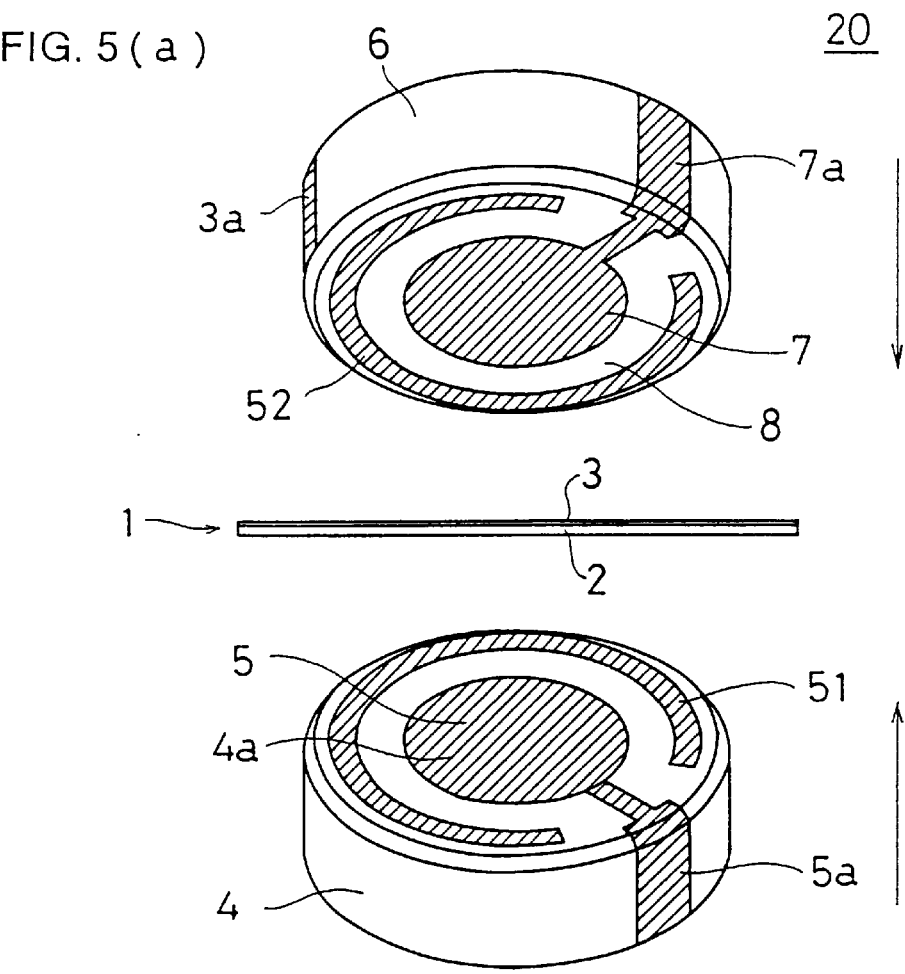
FIGS. 5(a) and 5(b) are schematic diagrams for explaining a fabrication method for the deformable mirror according to Embodiment 2.
Figure 5B:
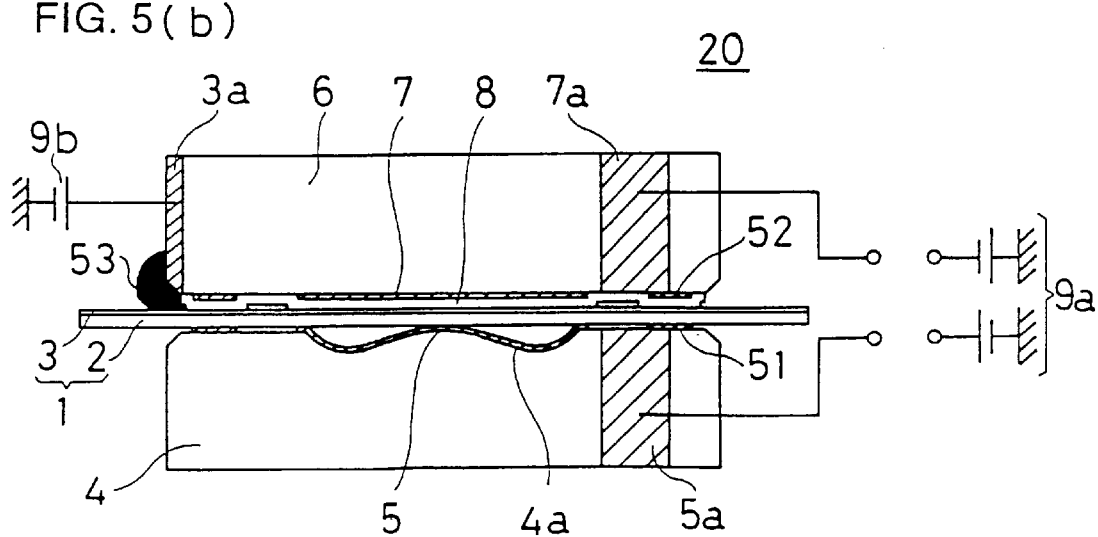

FIGS. 5(a) and 5(b) are schematic diagrams for explaining a fabrication method for the deformable mirror 20. The flexible member 1, the base plate 4 and the planar base plate 6 each have a construction as shown in FIG. 5(a). More specifically, the insulating film 2 of the flexible member 1 is a 5 μm polyimide film, for example. The electrode 3 formed on a surface of the flexible member 1 is a 1,000 Å thick aluminum film, for example, which also serves as the reflective surface.

Also usable as the material for the insulating film 2 are an epoxy resin, a silicone resin and the like. The thickness of the insulating film 2 may be in a range between 1 μm and 10 μm. Also usable as the material for the electrode 3 are ITO, nickel and the like. The thickness of the electrode 3 may be in a range between 500 Å and 5,000 Å.

The base plate 4 is a glass plate having a diameter of 10 mm and a thickness of 3 mm, and has on its surface the reference surface 4a which is capable of imparting the spherical aberration to light rays. The electrode 5a, an interconnection pad 5a and a spacer layer 51 are formed on the upper face and side face of the base plate 4, as shown in diagonally shaded areas in FIGS. 5(a) and 5(b), by forming and patterning a 1,000 Å thick aluminum film, for example.

The interconnection pad 5a is to be later connected to a lead line from the control power source 9a. The spacer layer 51 improves the contact between the flexible member 1 and the base plate 4.

Also usable as the material for the base plate 4 is a metal which can be polished to a mirror-smooth state. The size of the base plate 4 is properly selected according to an apparatus to which the deformable mirror is applied. Although the electrode 5, the interconnection pad 5a and the spacer layer 51 are formed of the same material as the electrode 3, ITO, nickel and the like are also usable. The thicknesses of the electrode 5, the interconnection pad 5a and the spacer layer 51 may be in a range between 500 Å and 5,000 Å.

The planar base plate 6 is formed of a transparent BK7 glass material, and has a diameter of 10 mm and a thickness of 3 mm, for example. The electrode 7, an interconnection pad 3a, an interconnection pad 7a and a spacer layer 52 are formed on the upper face and side face of the planar base plate 6, as shown in diagonally shaded areas in FIGS. 5(a) and 5(b), by forming and patterning a 1,000 Å thick ITO film, for example.

The interconnection pad 3a is to be later connected to the electrode 3 and a lead line from the power source 9b. The interconnection 7a is to be later connected to a lead line from the control power source 9a. The spacer layer 52 improves the contact between the flexible member 1 and the planar base plate 6.

The insulating layer 8 is formed of $SiO_2$ on the surface of the planar base plate 6, and has a thickness of 5,000 Å, for example. The insulating layer 8 prevents the electrode 7 from being brought in direct contact with the electrode 3 of the flexible member 1 when the flexible member 1 is fitted on the planar base plate 6.

Also usable as the material for the planar base plate 6 are transparent materials such as PMMA. The size of the planar base plate 6 is properly selected according to the apparatus to which the deformable mirror is applied. Any of various transparent conductive materials such as $SnO_2$ may be used as the materials for the electrode 7, the interconnection pads 3a and 7a and the spacer layer 52. The thicknesses of the electrode 7, the interconnection pads 3a and 7a and the spacer layer 52 may be in a range between 500 Å and 5,000 Å.

Also usable as the material for the insulating film 8 are $Si_3N_4$, $Ta_2O_5$ and the like. The thickness of the insulating film 8 may be in a range between 1,000 Å and 5,000 Å.

As shown in FIG. 5(b), the base plate 4 and the planar base plate 6 are combined with the flexible member 1 in directions indicated by arrows in FIG. 5(a). For example, a small amount of an adhesive is applied onto the spacer layer 51 of the base plate 4 and onto the insulating layer 8 on the spacer layer 52 of the planar base plate 6, and the flexible member 1 is bonded to the base plate 4 and the planar base plate 6 as being held therebetween.

The interconnection pad 3a is connected to the electrode 3 with solder 53, and further connected to the lead line from the power source 9b. The interconnection pad 5a and the interconnection pad 7a are respectively connected to the lead lines from the control power source 9a. Thus, the desired deformable mirror 20 is completed.

Figure 6:
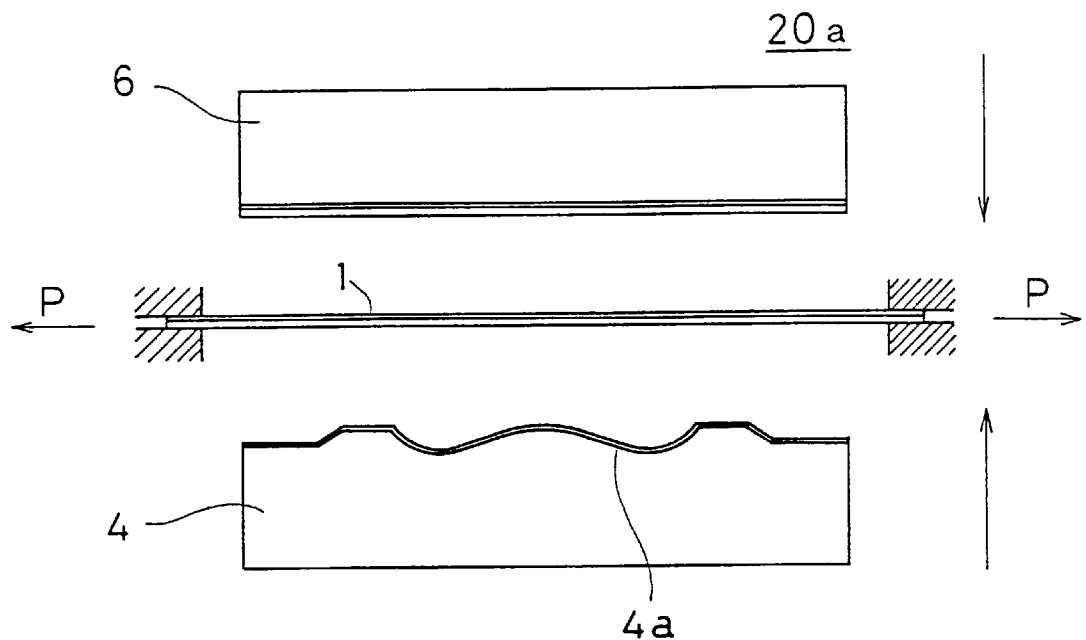
FIGS. 6 to 9 are schematic diagrams illustrating first to fourth exemplary methods of combining a flexible member with a base plate and a planar base plate for the deformable mirror according to Embodiment 2.

FIG. 6 is a schematic diagram illustrating a first exemplary method of combining a flexible member with a base plate and a planar base plate for a deformable mirror 20a. The construction of and the fabrication method and driving method for the deformable mirror 20a are substantially the same as those for the deformable mirror 20, except that the flexible member 1 is tensed by application of a tensile force P when the flexible member 1 is combined with the base plate and the planar base plate.

As shown in FIG. 6, the application of the tensile force P to the flexible member 1 is achieved by cramping several portions of the periphery of the flexible member 1 and stretching the flexible member 1 with a force of an appropriate magnitude.

Since the flexible member 1 of the deformable mirror 20a is tensed with the tensile force P, the flexible member 1 is less liable to wrinkle when the flexible member 1 is fitted on the reference surface or the planar surface. Thus, the flexible member 1 can be deformed into a desired configuration with high accuracy.

Where this arrangement is applied to the deformable mirror 10 of Embodiment 1 which includes the base plates 4 and 6 respectively having the reference surfaces 4a and 4b with different curvature radii, the flexible member 1 can selectively take three different shapes by assuming: a state where the flexible member 1 is fitted on the reference surface 4a; a state where the flexible member 1 is fitted on the reference surface 4b; and a state where the flexible member 1 is kept flat by a tensile force. That is, three different degrees of spherical aberration can selectively be imparted to the light rays. Therefore, data can be reproduced from three types of optical disks having different thicknesses.

Figure 7:
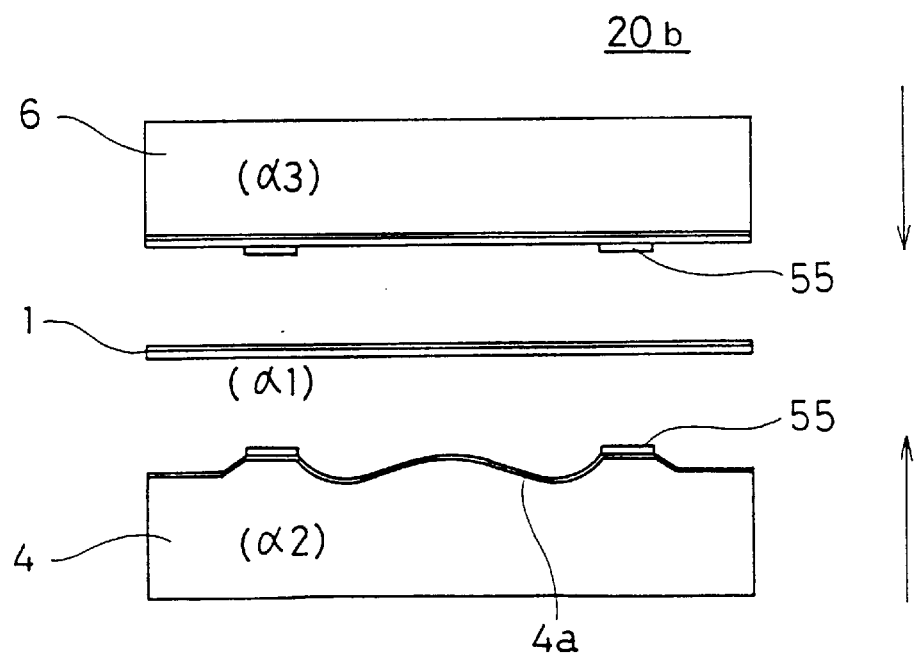

FIG. 7 is a schematic diagram illustrating a second exemplary method of combining a flexible member with a base plate and a planar base plate for a deformable mirror 20b. The construction of and the fabrication method and driving method for the deformable mirror 20b are substantially the same as those for the deformable mirror 20, except that the flexible member is combined with the base plate and the planar base plate at a temperature higher than room temperature.

This combining process employs a thermosetting adhesive 55 which cures at a temperature higher than room temperature. Further, the linear expansion coefficient $\alpha 1$ of the flexible member 1 is greater than the linear expansion coefficients $\alpha 2$ and $\alpha 3$ of the base plate 4 and the planar base plate 6 ($\alpha 1 > \alpha 2, \alpha 3$). The combining process is performed at a temperature higher than room temperature to stretch the flexible member 1 by thermal stress.

More specifically, when the flexible member 1, the base plate 4 and the planar base plate 6 are heated up to a temperature higher than room temperature, the flexible member 1 expands more than the base plate 4 and the planer base plate 6 because the linear expansion coefficient $\alpha 1$ of the flexible member 1 is greater than the linear expansion coefficients $\alpha 2$ and $\alpha 3$ of the base plate 4 and the planar base plate 6. In this state, the adhesive 55 cures to bond the flexible member 1 to the base plate 4 and the planar base plate 6. When the deformable mirror thus fabricated is cooled to room temperature upon completion of the combining process, the flexible member 1, the base plate 4 and the planar base plate 6 tend to restore their unexpanded states. However, the flexible member 1 expanded to a greater extent cannot restore its original state, because the flexible member 1 has already been combined with the base plate 4 and the planar base plate 6 which each have a thickness much greater than the flexible member 1. Therefore, the flexible member 1 is stretched with a tensile force by a thermal stress.

Since the combining method for the deformable mirror 20b obviates the need for cramping the periphery of the flexible member 1 to tense the flexible member 1 with the tensile force, the deformable mirror 20b can be produced by means of a simple production apparatus.

Figure 8:
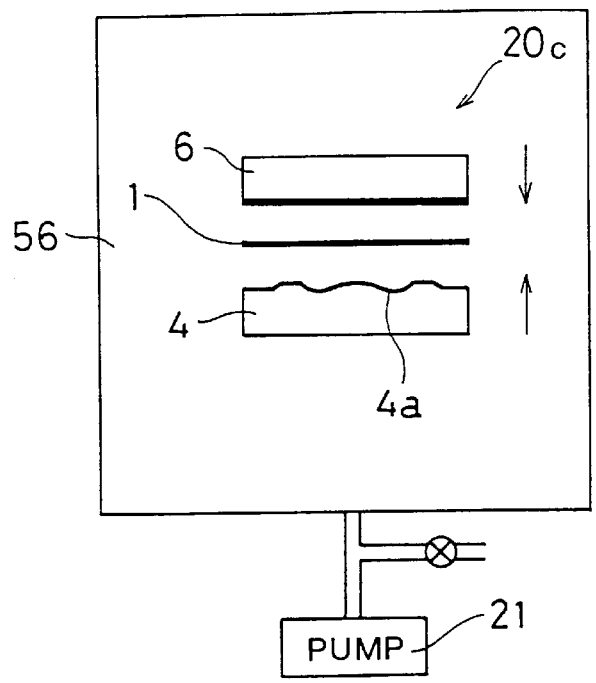

FIG. 8 is a schematic diagram illustrating a third exemplary method of combining a flexible member with a base plate and a planar base plate for a deformable mirror 20c. The construction of and the fabrication method and driving method for the deformable mirror 20c are substantially the same as those for the deformable mirror 20, except that the flexible member 1 is combined with the base plate 4 and the planar base plate 6 in vacuum.

In the combining process, the flexible member 1, the base plate 4 and the planar base plate 6 are placed in a vacuum chamber 56, which is then evacuated by a pump 21. In this state, the base plate 4 and the planar base plate 6 are properly positioned with respect to the flexible member 1 so as to be held therebetween, and then the pressure of the vacuum chamber 56 is returned to atmospheric pressure. Since a space between the base plate 4 and the planar base plate 6 where the flexible member 1 is deformed is maintained under vacuum, the flexible member 1 is combined with the base plate 4 and the planar base plate 6 by atmospheric pressure.

The combining method does not use an adhesive to combine the flexible member 1 with the base plate 4 and the planar base plate 6. This avoids an increase in the distance between the flexible member 1 and the base plate 4 and the distance between the flexible member 1 and the planar base plate 6, which may otherwise be entailed by the application of the adhesive. Hence, the driving voltage required for the shifting of the flexible member 1 is not increased. Further, since the space where the flexible member 1 is deformed is maintained under vacuum, air is not trapped between the flexible member 1 and the reference surface or the planar surface when the flexible member 1 is fitted on the reference surface or on the planar surface. Therefore, smooth deformation of the flexible member can be ensured.

Figure 9:
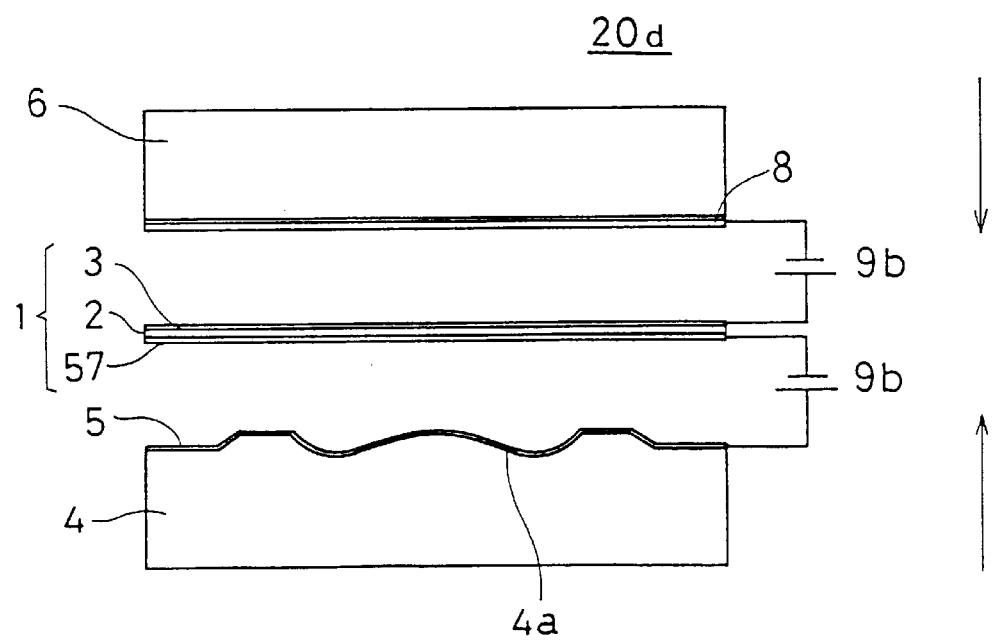

FIG. 9 is a schematic diagram illustrating a fourth exemplary method of combining a flexible member with a base plate and a planar base plate for a deformable mirror 20d. The construction or and the fabrication method and driving method for the deformable mirror 20d are substantially the same as those for the deformable mirror 20, except that the flexible member 1 is combined with the base plate 4 and the planar base plate 6 by an anodic bonding method.

The anodic bonding method allows a glass and a metal to be bonded to each other by applying a voltage between the glass and the metal at a high temperature. In the deformable mirror 20 shown in FIGS. 5(a) and 5(b), the $SiO_2$ film (insulating layer) 8 is formed on the surface of the planar base plate 6 opposed to the flexible member 1, and the aluminum film (electrode) 3 is formed on the surface of the flexible member 1 opposed to the planar base plate 6. Therefore, the flexible member 1 can be combined with the planar base plate 6 by the anodic bonding method. Further, the aluminum film (electrode) 5 is formed on the surface of the base plate 4 opposed to the flexible member 1. Therefore, by providing a glass layer 57 on the surface of the flexible member 1 opposed to the base plate 4 (by formation of an $SiO_2$ film or application of a thin glass plate), the flexible member 1 can be combined with the base plate 4 by the anodic bonding method.

The combining method does not use an adhesive to combine the flexible member 1 with the base plate 4 and the planar base plate 6. This avoids an increase in the distance between the flexible member 1 and the base plate 4 and the distance between the flexible member 1 and the planar base plate 6, which may otherwise be entailed by the application of the adhesive. Hence, the driving voltage required for the shifting of the flexible member 1 is not increased.

Embodiment 3

Figure 10:
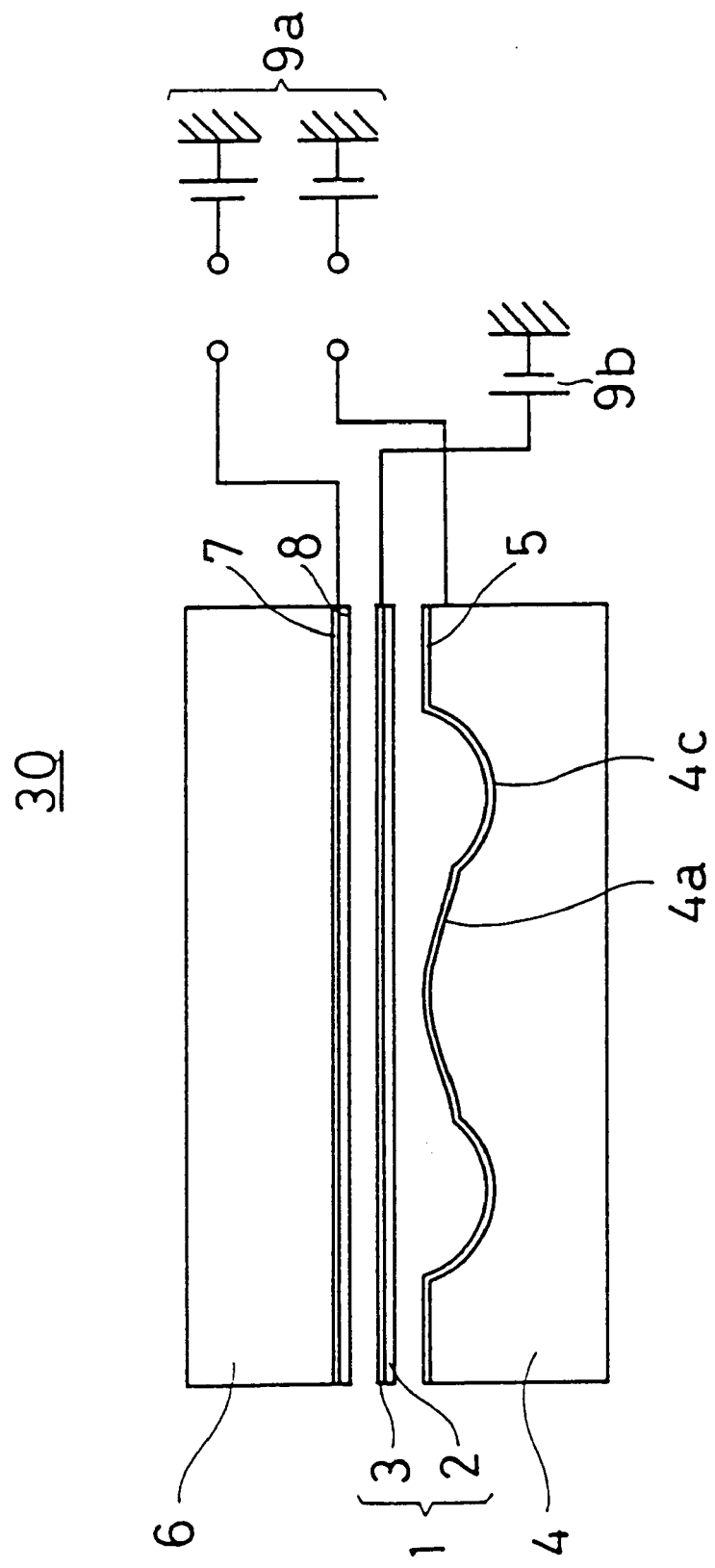
FIG. 10 is a schematic diagram illustrating the construction of a deformable mirror according to Embodiment 3 of the present invention.

FIG. 10 is a schematic diagram illustrating the construction of a deformable mirror according to Embodiment 3 of the present invention. The construction of the deformable mirror 30 of this embodiment is substantially the same as the deformable mirror 20, except that the first base plate 4 located on the lower side in FIG. 10 has a reference surface 4a and a reference surface 4c having different curvature radii. The reference surface 4a located in a central portion of the first base plate 4 serves to impart spherical aberration to light rays, while the reference surface 4c located on the outer side serves as an aperture. The driving method and fabrication method for the deformable mirror 30 is the same as those for the deformable mirror 20.

The fact that the outer reference surface 4c serves as the aperture is based on the following ground.

Figure 11A:
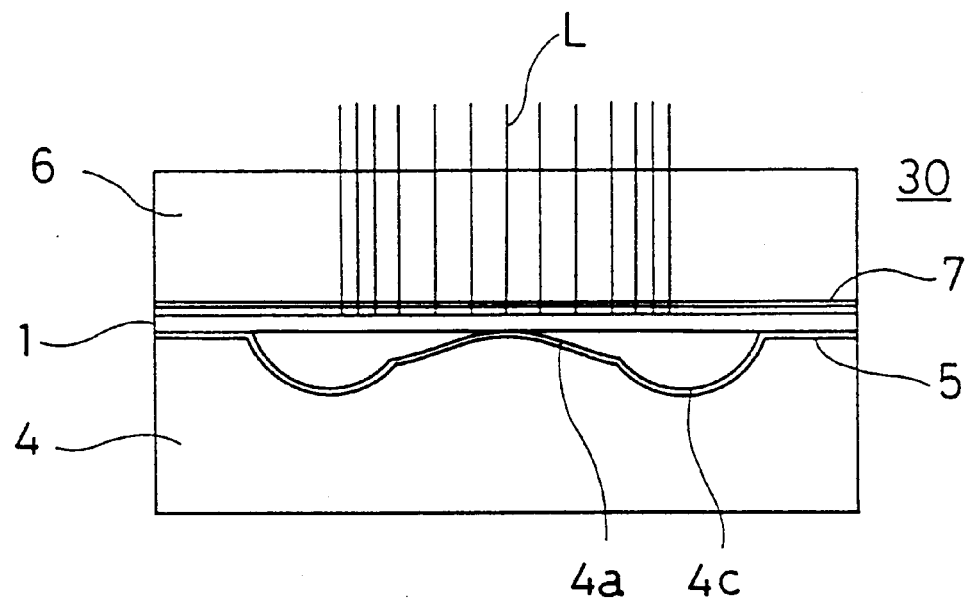
FIGS. 11(a) and 11(b) are schematic diagrams illustrating reflection of light rays by the deformable mirror according to Embodiment 3.
Figure 11B:
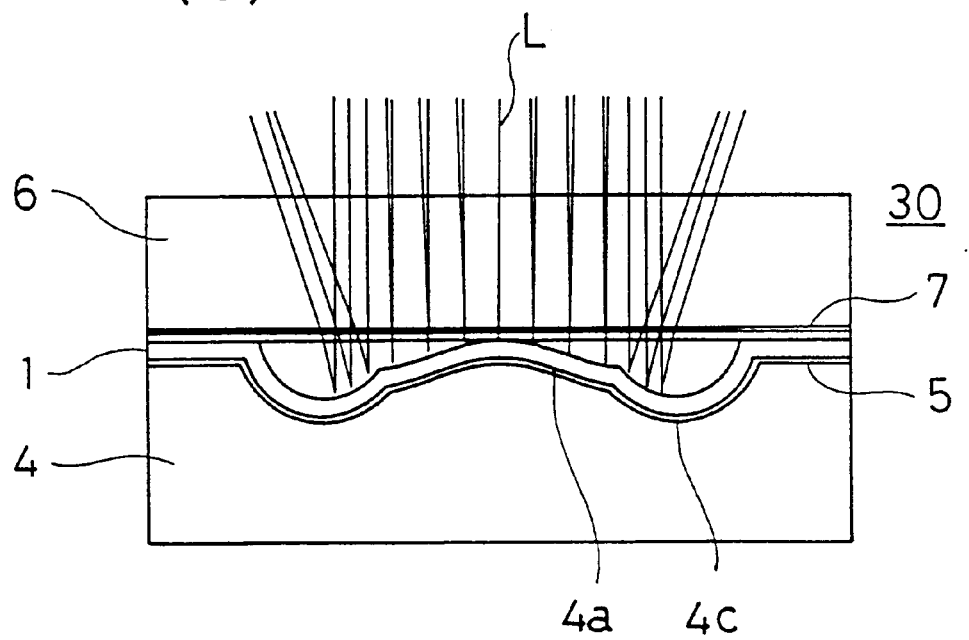

FIGS. 11(a) and 11(b) are schematic diagrams illustrating reflection of light rays by the deformable mirror 30. FIG. 11(a) illustrates a state where the flexible member 1 is kept flat. In this state, light rays incident at the right angle on the flexible member 1 are reflected at the right angel by the flexible member 1.

FIG. 11(b) illustrates a state where the flexible member 1 is fitted on the reference surfaces 4a and 4c. In this state, light rays L incident on a portion of the flexible member 1 fitted on the reference surface 4a are imparted with the spherical aberration. However, light rays L incident on a portion of the flexible member 1 fitted on the reference surface 4c are reflected outward as shown in FIG. 11(b) and further refracted outward by the planar base plate 6 thereby to be deflected outward at greater angles.

Where the deformable mirror is used for the aberration correction in an optical data reproducing apparatus capable of reproducing data from DVDs and CDs, for example, unnecessary light rays are deflected outward at greater angles so as not to interfere with the data reproduction from a disk. That is, the reference surface 4c serves as an aperture to deflect light rays outward at greater angles.

The deformable mirror 30 according to this embodiment has the same advantages as the deformable mirror 20 of Embodiment 2. In addition, the need for additionally providing an aperture in the optical data reproducing apparatus is obviated because the deformable mirror 30 also serves as the aperture to deflect unnecessary light rays outward. Therefore, the deformable mirror 30 is advantageous in the size reduction, simplification and cost reduction of the apparatus.

Further, since the light rays are further refracted outward by the planar base plate 6, the curvature radius of the reference surface 4c required for sufficiently deflecting the light rays outward can be reduced. Therefore, a gap defined between the flexible member 1 and the reference surface 4c can be reduced, so that the voltage required for fitting the flexible member 1 on the reference surfaces 4a and 4c can be reduced.

Although the second base plate 6 located on the upper side in FIGS. 11(a) and 11(b) is planar in this embodiment, the base plate 6 may have a curved surface which is capable of refracting light rays outward.

Figure 12:
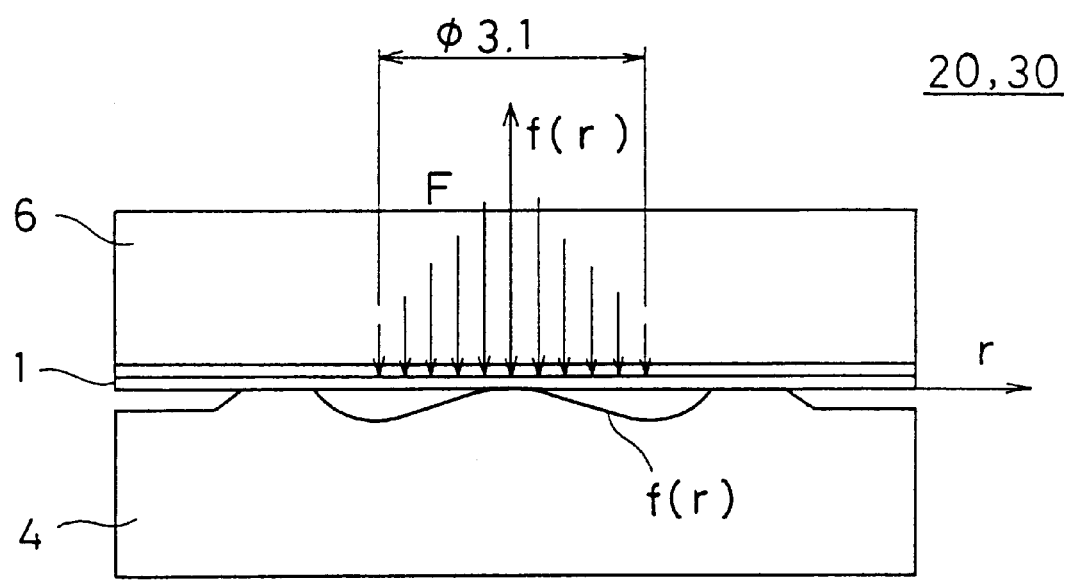
FIG. 12 is a schematic diagram for explaining calculation of a voltage to be applied for the driving of a flexible member.

FIG. 12 is a schematic diagram for explaining calculation of the voltage to be applied for the driving of the flexible member. The calculation of the voltage to be applied for shifting the flexible member 1 between the reference surfaces in the deformable mirrors 20 and 30 will hereinafter be described more specifically.

When data are reproduced from a CD by means of an optical system adapted for data reproduction from DVDs, for example, defocusing occurs due to a difference in the disk thickness. In the following calculation, it is assumed that the focal length of an object lens is 3.3 mm, the refractivity of the CD is 1.58, and the thickness of the CD is 1.2 mm.

In the deformable mirror 20, the reference surface 4a for the aberration correction is a curved surface represented by f(r)(μm):

$$f(r)=3.3168\times10^{-2}\cdot r^6-3.9542\times10^{-3}\cdot r^4-0.505\cdot r^2$$

wherein r is a distance (mm) from the center of the reference surface.

Where the flexible member 1 is formed of polyimide, a force F to be generated between the flexible member 1 and the reference surface 4a is represented by the following equation:

$$F=(V^2\epsilon_1^2\epsilon_2 S)/\{2(\epsilon_1 d_2+\epsilon_2 d_1)^2\}$$

wherein $\epsilon_1$ is the dielectric constant of the flexible member 1 (=4.5×10$^{-11}$ F/m), $\epsilon_2$ is the dielectric constant in vacuum (=8.85×10$^{-12}$ F/m), $d_1$ is the thickness of the flexible member 1 (=5 μm), $d_2$ is a distance between the flexible member 1 and the reference surface, V is a voltage and S is an area to which the voltage is applied (=30.2 mm$^2$).

The distance $d_2$ between the flexible member 1 and the reference surface 4a is given by the above equation f(r). The distance $d_2$ becomes greater (0.8 μm at the maximum) as the distance from the center increases. Therefore, the force F to be generated between the flexible member 1 and the reference surface 4a is the largest at the center of the reference surface, and decreases, as shown in FIG. 12, as the distance from the center increases. The magnitude of the force is proportional to the square of the voltage.

The voltage required for fully fitting the flexible member 1 on the reference surface 4a when the force distributed in such a way is exerted on the flexible member 1 is determined by simulation. The flexible member 1 used in the simulation has a Young's elasticity modulus E of 3.5 GPa and a Poisson's ratio ν of 0.39.

The voltage for the fitting of the flexible member 1 determined by the simulation is only about 3 V.

In the case of the deformable mirror 30, it is assumed that the reference surfaces 4a and 4c respectively include curved surfaces defined as below.

Reference surface 4a: Spherical surface having a curvature radius of 96.412 mm

Reference surface 4c: $f(r)=8.4093\times10^{-3}\cdot r^2+3.4017\times10^{-3}\cdot r^4-5.8817\times10^{-4}\cdot r^6+5.1565\times10^{-5}\cdot r^8-1.7408\times10^{-6}\cdot r^{10}$ The voltage for fully fitting the flexible member 1 on the reference surface 4a determined by simulation is about 50 V. A reason why the deformable mirror 30 requires a higher voltage than the deformable mirror 20 is as follows:

To deflect unnecessary light rays outward for prevention of interference with data reproduction from an optical disk, the reference surface 4c should be a curved surface which forms a relatively large angle with respect to a plane perpendicular to the incident light rays. Further, if the boundary between the reference surfaces 4a and 4c is not smooth with extreme discontinuity, the flexible member 1 cannot be fitted on the reference surfaces 4a and 4c. Therefore, the reference surface 4a should also have a relatively large curvature radius. As a result, the distance between the flexible member 1 and the reference surfaces is increased (5 μm at the maximum), so that the deformable mirror 30 requires a higher voltage than the deformable mirror 20 for fitting the flexible member 1 on the reference surfaces.

As described above, the deformable mirrors 20 and 30 according to the present invention can selectively fit the flexible member either on the reference surface or on the planar surface by the application of about 50 V at the maximum, not by utilizing a motor, to selectively impart the spherical aberration to light rays. Thus, the deformable mirrors are advantageous in the size reduction and energy saving of an optical apparatus.

Embodiment 4

Figure 13A:
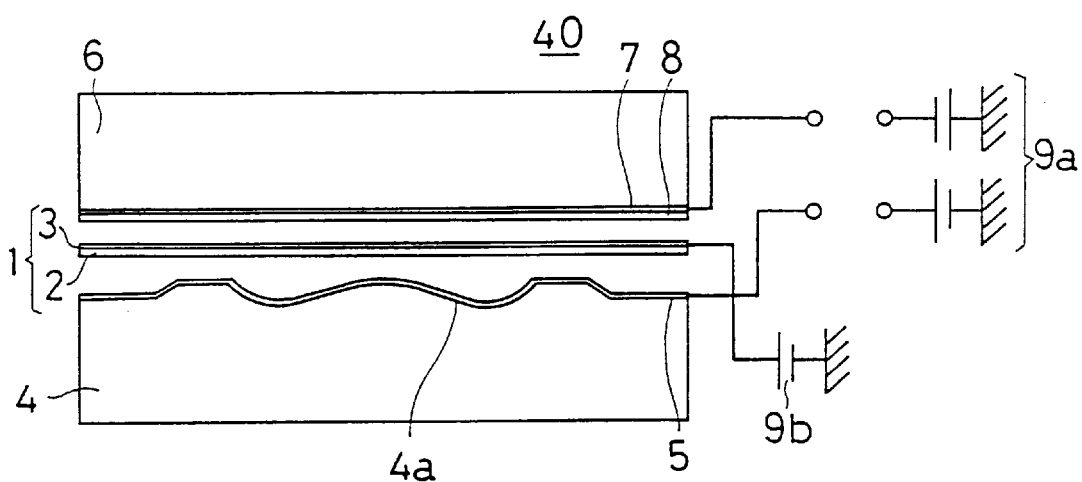
FIGS. 13(a) and 13(b) are schematic diagrams illustrating the construction of a deformable mirror according to Embodiment 4 of the present invention.
Figure 13B:
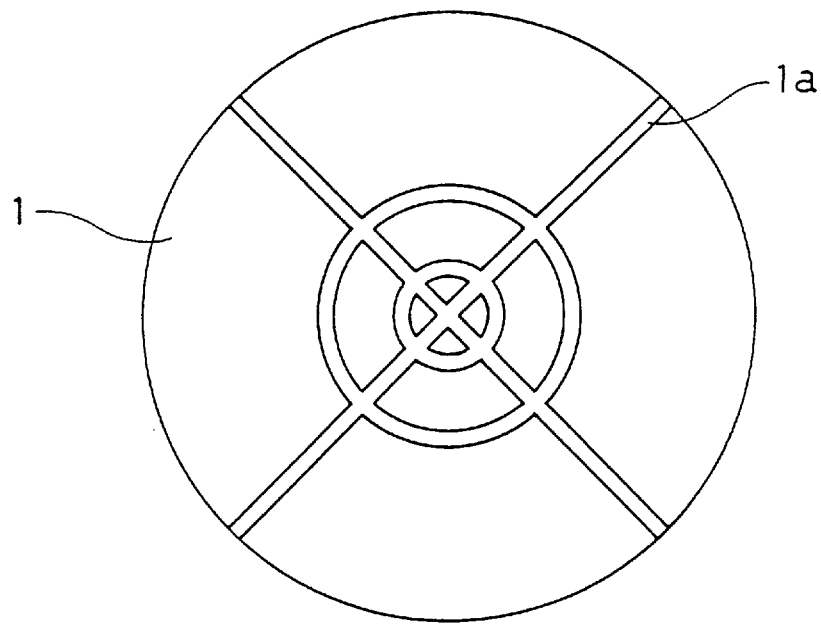

FIGS. 13(a) and 13(b) are schematic diagrams illustrating the construction of a deformable mirror according to Embodiment 4 of the present invention. The deformable mirror 40 of this embodiment has substantially the same construction as the deformable mirrors 20 and 30 as shown in FIG. 13(a), except that half-etched grooves 1a in a pattern as shown in FIG. 13(b) are formed in the insulating film 2 provided on the flexible member 1, i.e., on a surface of the flexible member 1 opposite to the reflective surface thereof. The driving method and fabrication method for the deformable mirror 40 are the same as those for the deformable mirrors 20 and 30.

Since the deformable mirror 40 of this embodiment has the half-etched grooves formed in the flexible member, air flows into and out of the deformable mirror through the half-etched grooves when the flexible member is shifted between the reference surface and the planar surface. Therefore, air is not trapped between the flexible member and the reference surface. This ensures smooth deformation of the flexible member.

Embodiment 5

Figure 14A:
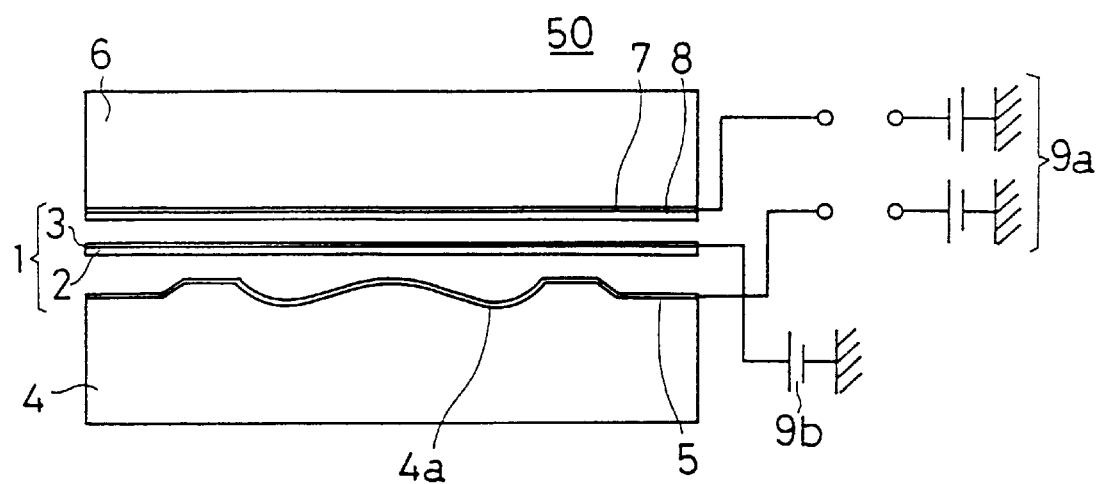
FIGS. 14(a) and 14(b) are schematic diagrams illustrating the construction of a deformable mirror according to Embodiment 5 of the present invention.
Figure 14B:
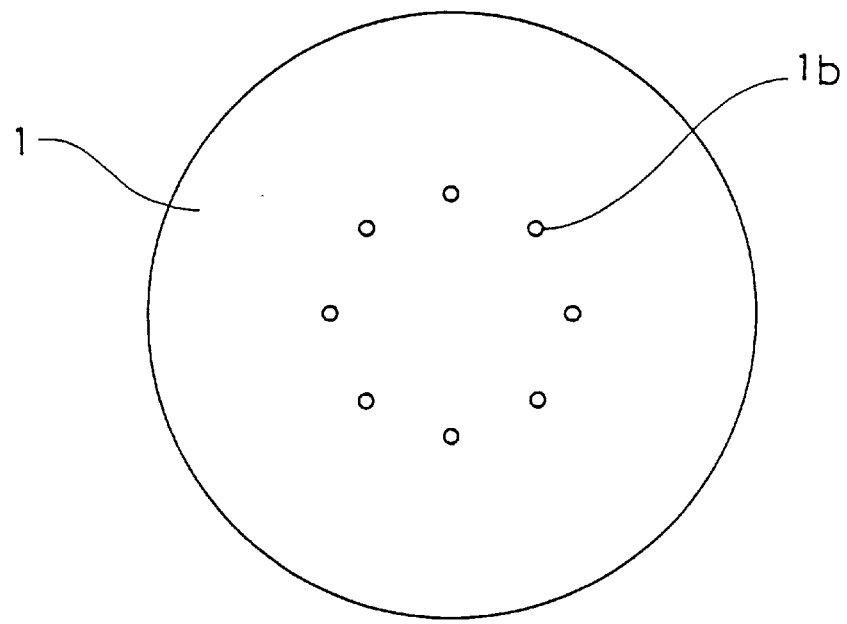

FIGS. 14(a) and 14(b) are schematic diagrams illustrating the construction of a deformable mirror according to Embodiment 5 of the present invention. The deformable mirror 50 of this embodiment has substantially the same construction as the deformable mirrors 20 and 30 as shown in FIG. 14(a), except that minute vent holes 1b which do not interfere with reflection of light rays for data reproduction are formed in the flexible member 1 as shown in FIG. 14(b). The formation of the vent holes 1b is achieved by punching or etching. The driving method and fabrication method for the deformable mirror 50 are the same as those for the deformable mirrors 20 and 30.

Since the deformable mirror 50 of this embodiment has the minute vent holes formed in the flexible member, air escapes to an opposite side of the flexible member through the vent holes when the flexible member is shifted between the reference surface and the planar surface. Therefore, air is not trapped between the flexible member and the reference surface. This ensures smooth deformation of the flexible member.

Embodiment 6

FIG. 15 is a schematic diagram illustrating the construction of a deformable mirror according to Embodiment 6 of the present invention. The deformable mirror 60 of this embodiment has substantially the same construction as the deformable mirrors 20 and 30, except that concentric grooves 4d are formed in the reference surface 4a of the base plate 4. The driving method and fabrication method for the deformable mirror 60 are the same as those for the deformable mirrors 20 and 30.

Since the deformable mirror 60 of this embodiment has the concentric grooves formed in the base plate 4, air is not trapped between the flexible member and the reference surface, but trapped in the grooves when the flexible member is shifted between the reference surface and the planar surface. This ensures smooth deformation of the flexible member.

Embodiment 7

FIG. 16 is a schematic diagram illustrating the construction of a deformable mirror according to Embodiment 7 of the present invention. The deformable mirror 70 of this embodiment has substantially the same construction as the deformable mirrors 20 and 30, except that a through-hole 4b is formed in the base plate 4. The driving method and fabrication method for the deformable mirror 70 are the same as those for the deformable mirrors 20 and 30.

Since the deformable mirror 70 of this embodiment has the through-hole formed in the base plate 4, air flows into and out of the deformable mirror through the through-hole when the flexible member is shifted between the reference surface and the planar surface. Therefore, air is not trapped between the flexible member and the reference surface. This ensures smooth deformation of the flexible member.

Embodiment 8

Although the aforesaid deformable mirrors 20, 30, 40, 50, 60 and 70 each employ as the driver 9 a device which utilizes an electrostatic force for the shifting of the flexible member, any other driving devices may be employed as the driver 9. There will hereinafter be described deformable mirrors which employ drivers utilizing other driving forces for the shifting of the flexible member.

An embodiment which employs a driver 9 utilizing an electromagnetic force for the shifting of the flexible member will first be described.

Figure 17:
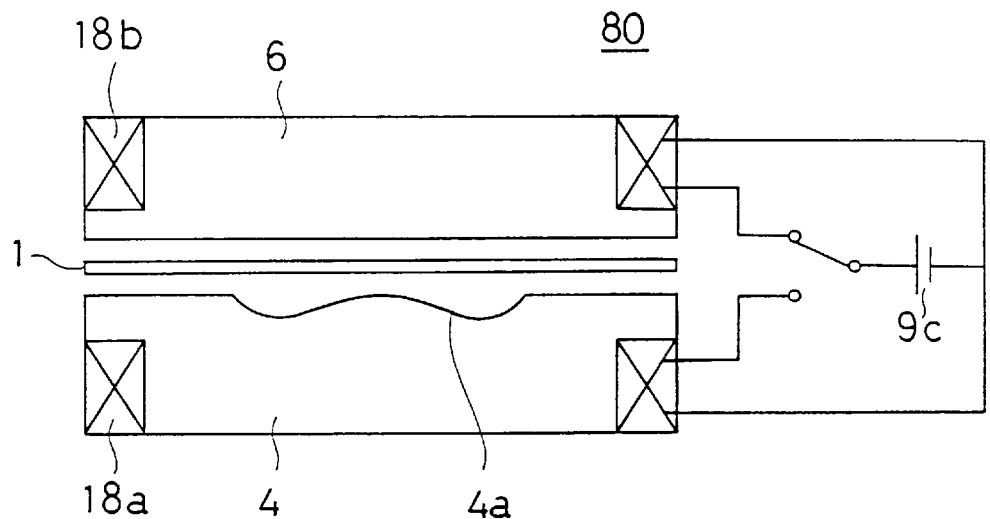
FIG. 17 is a schematic diagram illustrating the construction of a deformable mirror according to Embodiment 8 of the present invention.

FIG. 17 is a schematic diagram illustrating the construction of a deformable mirror according to Embodiment 8 of the present invention. The deformable mirror 80 of this embodiment comprises a flexible member 1, a base plate 4, a planar base plate 6, a power source 9c and magnetic coils 18a and 18b.

The flexible member 1 is formed of a resiliently deformable magnetic material and, as required, provided with a reflective surface on its surface. The base plate 4 has a reference surface 4a which is capable of imparting incident light rays with spherical aberration when the flexible member 1 is fitted on the reference surface 4a. The magnetic coil 18a is attached to the base plate 4 as shown in FIG. 17.

The planar base plate 6 is formed of a transparent material, and the magnetic coil 18b is attached thereto. The power source 9c is connected to the magnetic coils 18a and 18b, and conduction of current to the magnetic coils 18a and 18b is controlled by a switch.

When the magnetic coil 18b is energized, a magnetic field is generated around the magnetic coil 18b, so that the flexible member 1 of the magnetic material is attracted to the planar base plate 6 thereby to be fitted on the planar surface of the planar base plate 6. When the switch is switched to energize the magnetic coil 18b, the magnetic field generated around the magnetic coil 18b is extinguished and, in turn, a magnetic field is generated around the magnetic coil 18a so that the flexible member 1 is attracted to the base plate 4 thereby to be fitted on the reference surface 4a of the base plate 4.

The switching between the magnetic coils 18a and 18b enables the flexible member 1 to be shifted between the reference surface and the planar surface. Thus, the shape of the reflective surface of the flexible member can be changed thereby to selectively impart the spherical aberration to the light rays.

The deformable mirror 80 according to the present invention does not employ a motor as the driver 9 but utilizes an electromagnetic force and, therefore, is advantageous in the size reduction and energy saving of an optical device. Since the deformable mirror 80 does not utilize an electrostatic force, the need for providing an electrode and an insulating film is obviated thereby to simplify the construction of the deformable mirror. Further, the time required for the fabrication of the deformable mirror can be shortened.

Embodiment 9

An embodiment which employs a driver 9 utilizing a pump for the shifting of the flexible member will be described.

Figure 18:
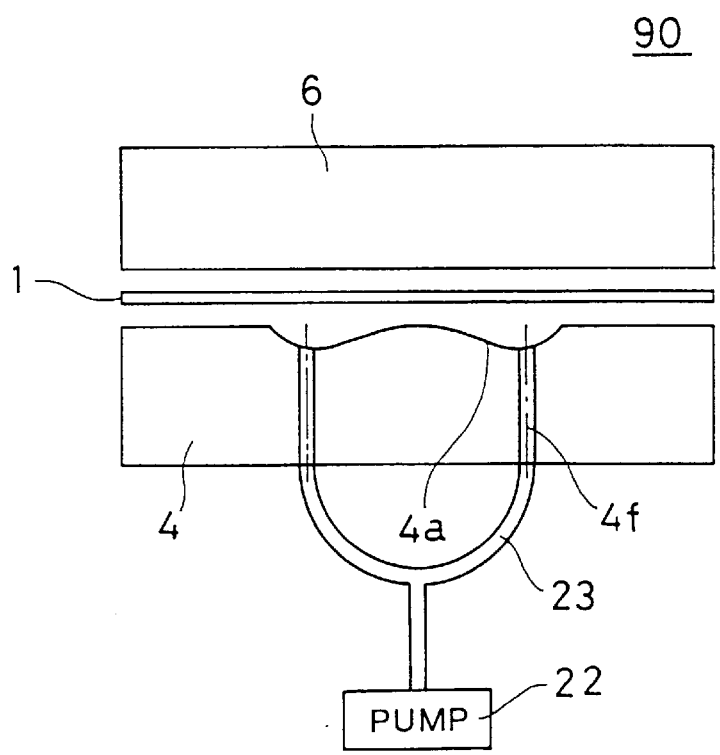
FIG. 18 is a schematic diagram illustrating the construction of a deformable mirror according to Embodiment 9 of the present invention.

FIG. 18 is a schematic diagram illustrating the construction of a deformable mirror according to Embodiment 9 of the present invention. The deformable mirror 90 of this embodiment comprises a flexible member 1, a base plate 4 having a reference surface 4a and through-holes 4f, a planar base plate 6, a pump 22 capable of sucking and compressing air, and connection pipes 23, which are disposed as shown in FIG. 18.

The switching of the pump 22 for air suction and air compression allows the flexible member 1 to be selectively fitted on the reference surface 4a or on the planar surface so as to selectively impart incident light rays with spherical aberration.

Since the deformable mirror 90 employs the pump as the driver 9, the flexible member 1 can tightly be fitted on the base plate 4 or on the planar base plate 6 by air suction or by air compression. Thus, the deformable mirror 90 is less susceptible to environmental influences such as a temperature change.

Embodiment 10

A pick-up device employing the deformable mirror according to the present invention will hereinafter be described by way of Embodiment 10.

Figure 19A:
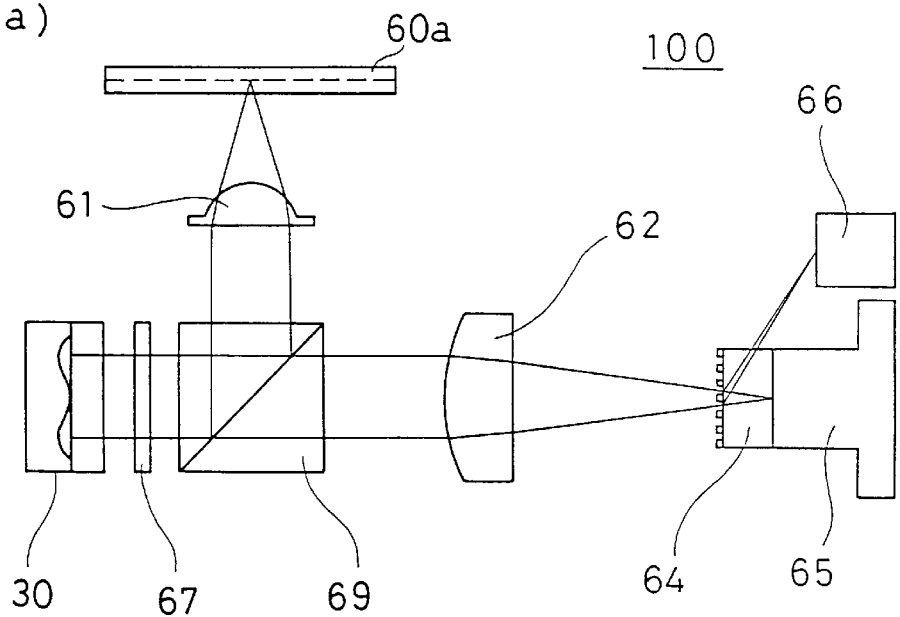
FIGS. 19(a) and 19(b) are schematic diagrams illustrating the construction of a pick-up device employing a deformable mirror according to the present invention.
Figure 19B:
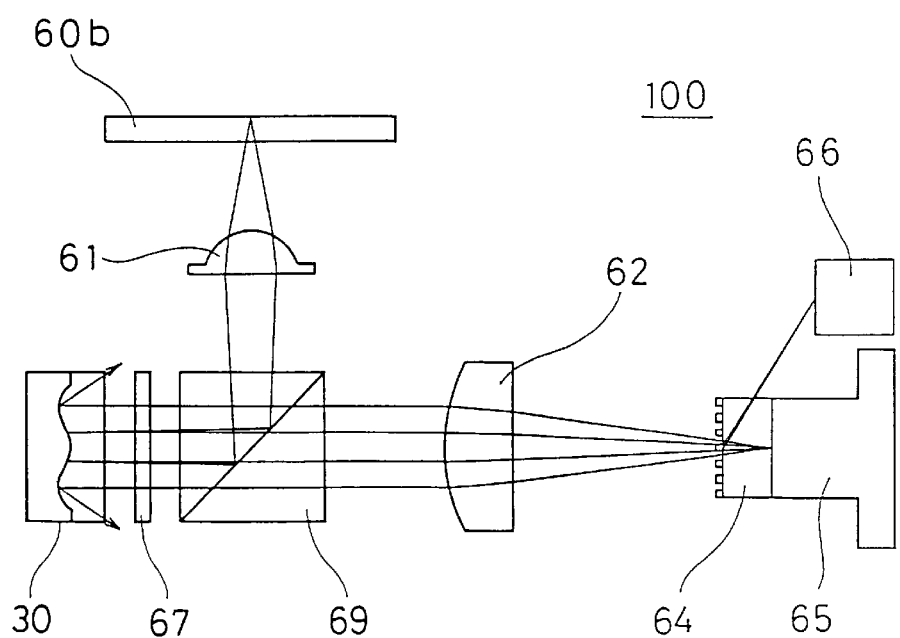

FIGS. 19(*a*) and 19(*b*) are schematic diagrams illustrating the construction of the pick-up device employing the deformable mirror according to the present invention. The pick-up device 100 comprises the deformable mirror 30 of the present invention, an object lens 61 for focusing light rays on a DVD 60a or a CD 60b, a collimating lens 62, a hologram 64, a semiconductor laser 65, a signal detector 66, a λ/4-wave plate 67, and a polarization beam splitter 69, which are disposed as shown in FIGS. 19(*a*) and 19(*b*).

The pick-up device 100 is designed such that, when the flexible member 1 of the deformable mirror 30 is fitted on the planar base plate 6, light rays are focused on a data recorded surface of the DVD 60a and, when the flexible member 1 is fitted on the base plate 4, light rays are focused on a data recorded surface of the CD 60b.

FIG. 19(*a*) illustrates a state where data are reproduced from the DVD 60a. For data reproduction from the DVD, the flexible member 1 of the deformable mirror 30 is fitted on the planar base plate 6. Light rays emitted from the semiconductor laser 65 travel through an optical path as shown in FIG. 19(*a*), and reach the data recorded surface of the DVD 60a. Optical data signals reproduced from the DVD travel back through the optical path, and reach the hologram 64, in which the optical data signals are divided into null optical signals and primary optical signals. The primary optical signals out of the optical data signals are detected by the signal detector 66.

FIG. 19(*b*) illustrates a state where data are reproduced from the CD 60b. For data reproduction from the CD, the flexible member 1 of the deformable mirror 30 is fitted on the base plate 4. Light rays emitted from the semiconductor laser 65 are reflected by the deformable mirror 30. At this time, spherical aberration is imparted to the light rays to correct defocusing caused due to a thickness difference between the DVD and the CD, and unnecessary light rays are deflected outward. The light rays imparted with the spherical aberration travel through an optical path as shown in FIG. 19(*b*), and reach the data recorded surface of the CD 60b. Optical data signals reproduced from the CD travel back through the optical path, and reach the hologram 64. Primary optical signals separated from the optical data signals are detected by the signal detector 66.

Although the DVD and the CD have different thicknesses, the pick-up device 100 can selectively focus the light rays either on the data recorded surface of the DVD or on the data recorded surface of the CD by shifting the flexible member 1 of the deformable mirror 30. This is achieved simply by providing the deformable mirror 30 on the optical path in the pick-up device, and makes it possible to reduce the size of the pick-up device and simplify the construction of the pick-up device. In addition, the incorporation of the deformable mirror 30 can readily be matched to a conventional pick-up device fabrication process, and does not require a drastic modification to a conventional pick-up device production line. Further, the deformable mirror 30 also serves as an aperture, thereby obviating the need for additionally providing an aperture and an actuator for retracting the aperture. Thus, the pick-up device can have a reduced size and a simplified construction and, hence, is advantageous in the size reduction and energy saving of an optical data reproducing apparatus.

Although this embodiment employs the deformable mirror 30 having the aperture function, it is also possible to employ a deformable mirror which does not have the aperture function. In such a case, an aperture should be provided on the optical path.

Embodiment 11

An optical data reproducing apparatus employing the pick-up device according to Embodiment 10 will be described by way of Embodiment 11.

Figure 20:
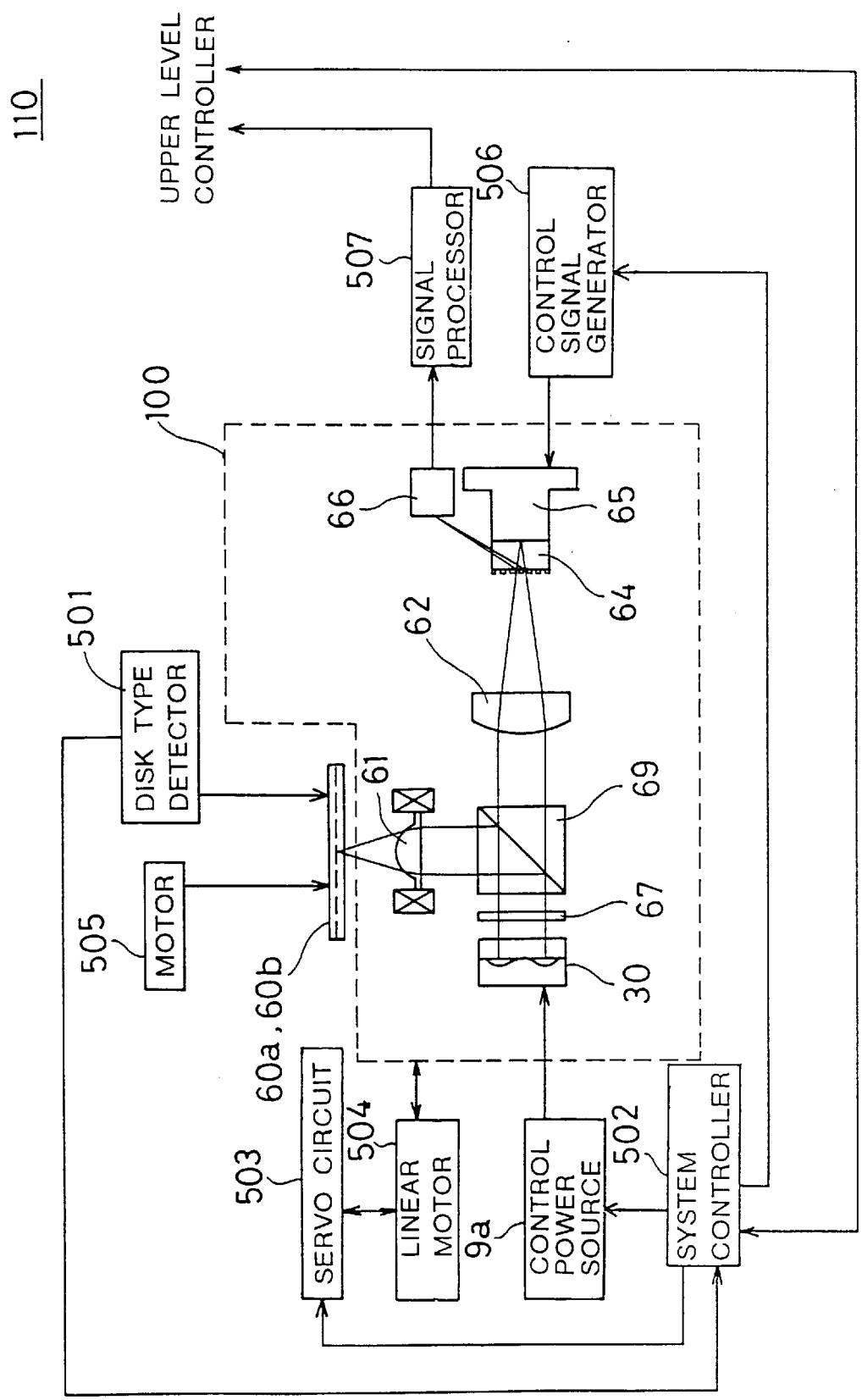
FIG. 20 is a diagram illustrating the construction of an optical data reproducing apparatus employing the pick-up device according to the present invention.
Figure 21:
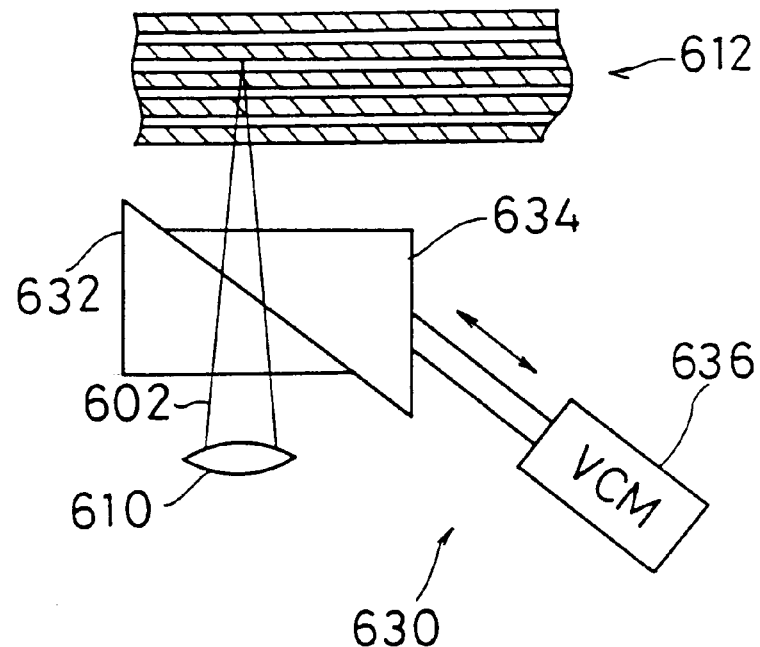
FIG. 21 is a schematic diagram illustrating one exemplary aberration corrector of the prior art.
Figure 22:
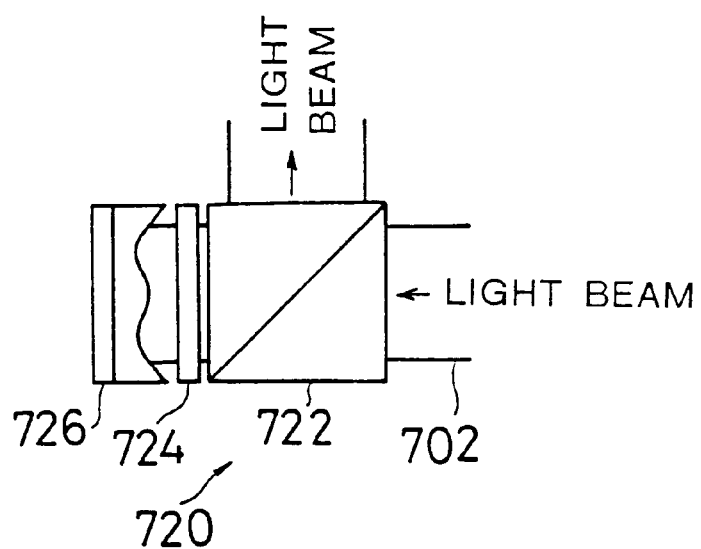
FIG. 22 is a schematic diagram illustrating another exemplary aberration corrector of the prior art.
Figure 23:
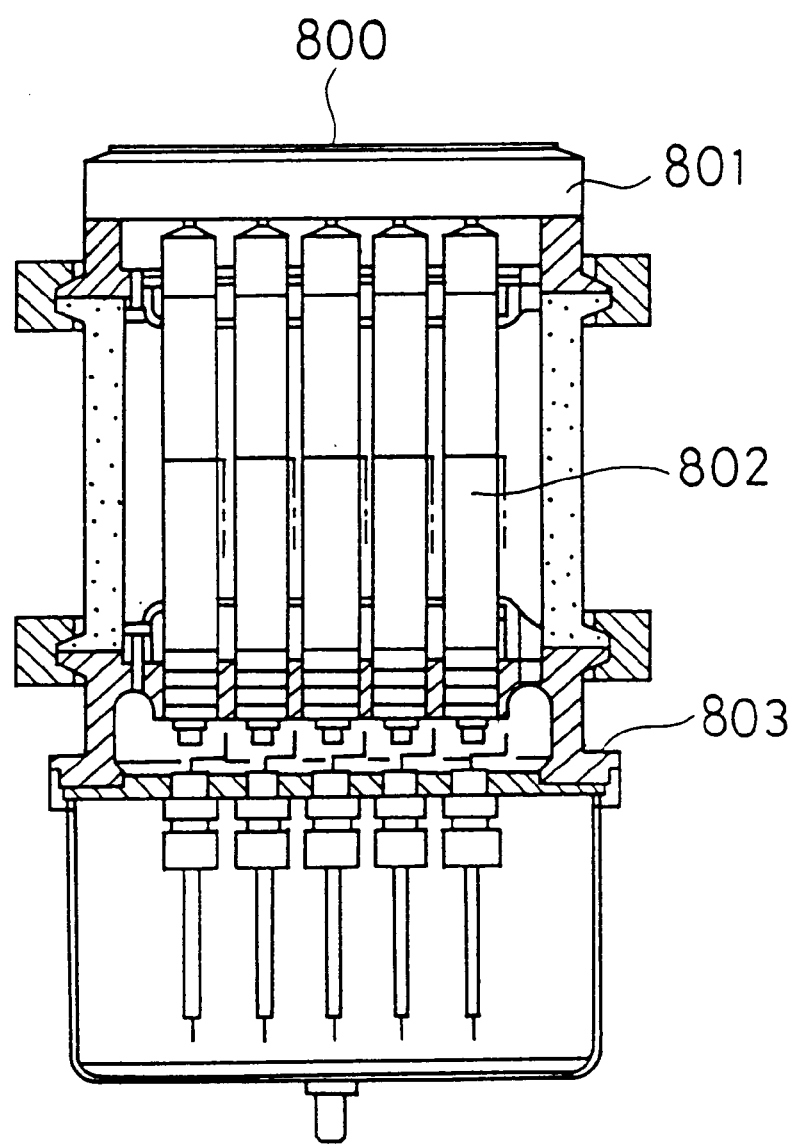
FIG. 23 is a schematic diagram illustrating, in detail, the construction of a deformable mirror used in the prior art aberration corrector.

FIG. 20 is a diagram illustrating the construction of the optical data reproducing apparatus employing the pick-up device of Embodiment 10. The optical data reproducing apparatus 110 of this embodiment comprises the pick-up device 100 of Embodiment 10 capable of data reproduction from a DVD 60a and a CD 60b, a control power source 9a for applying a voltage for shifting the flexible member of the deformable mirror 30, a disk type detector 501 for sensing the type of a disk, a system controller 502, a servo circuit 503, a linear motor 504, a motor 505 for rotating the disk, a control signal generator 506, and a signal processor 507.

An explanation will herein be given mainly to mechanism for properly shifting the flexible member of the deformable mirror 30 depending on the type of the disk.

When the CD 60b is inserted in the optical data reproducing apparatus 110 in place of the DVD 60a, the inserted disk is detected by the disk type detector 501. In response to the detection of the disk, the disk type detector 501 sends information indicative of the type of the inserted disk to the system controller 502 which controls the overall optical data reproducing apparatus.

The system controller 502 which has received the information sends the information to the control power source 9a for controlling voltage application to the deformable mirror 30, the servo circuit 503 for controlling the linear motor 504, and the control signal generator 506.

On the basis of the received information, the control power source 9a controls the voltage application to the deformable mirror 30 to shift the flexible member. Thus, the spherical aberration to be imparted to light rays is controlled.

Simultaneously therewith, the object lens 61 is moved to place its focal point on the disk by the linear motor 504, and then the control signal generator 506 gives a light irradiation command to the semiconductor laser 65.

In the optical data reproducing apparatus 110 of this embodiment, the control of the spherical aberration to be imparted to the light rays in response to the insertion of the disk is achieved only by signal processing without utilizing an actuator for mechanical driving. Therefore, this embodiment is advantageous in the size reduction and energy saving of the optical data reproducing apparatus.

The fabrication of the optical data reproducing apparatus can be achieved simply by additionally providing the pick-up device and the disk type detector in a conventional optical data reproducing apparatus. Therefore, the construction of the optical data reproducing apparatus can be simplified. In addition, the incorporation of the pick-up device and the disk type detector can readily be matched to the conventional production process for the optical data reproducing apparatus, and does not require a drastic modification to the conventional production line for the optical data reproducing apparatus.

The deformable mirror according to the present invention, in which the flexible member is simply held between the first base plate and the second base plate, features a simplified construction and easy assembly. Since the flexible member is deformed to be fitted on the first reference surface or on the second reference surface by the driver, the deformable mirror is insusceptible to environmental influences such as vibrations and a temperature change.

The fabrication of the pick-up device or the optical data reproducing apparatus according to the present invention can be achieved simply by additionally providing the deformable mirror of the present invention and several control systems for controlling the deformable mirror in a pick-up device or an optical data reproducing apparatus having the conventional construction. The incorporation of the deformable mirror and the control systems can readily be matched to the conventional production process, and does not require a drastic modification to the conventional production line.

What is claimed is:

1. A deformable mirror comprising:

a first base plate having a first reference surface capable of imparting incident light rays with a first degree of spherical aberration;

a transparent second base plate having a second reference surface opposed to the first reference surface and capable of imparting the incident light rays with a second degree of spherical aberration different from the first degree of spherical aberration;

a flexible member disposed between the first base plate and the second base plate and having a reflective surface on a surface thereof, the flexible member being adapted to be fitted on the first reference surface or on the second reference surface; and a driver for fitting the flexible member on the first reference surface or on the second reference surface, wherein the flexible member is held between the first base plate and the second base plate, and the light rays to be reflected by the reflective surface are imparted with the first degree of spherical aberration or with the second degree of spherical aberration by fitting the flexible member on the first reference surface or on the second reference surface by the driver.

2. A deformable mirror of claim 1, wherein the first reference surface of the first base plate includes a first curved surface which is capable of imparting light rays with the first degree of spherical aberration and a second curved surface which is capable of reflecting light rays outward at greater reflection angles and, when the flexible member is fitted on the first reference surface, light rays incident on a central portion of the reflective surface are imparted with the first degree of spherical aberration by the first curved surface, and unnecessary light rays incident on a peripheral portion of the reflective surface are reflected outward at greater reflection angles by the second curved surface.

3. A deformable mirror of claim 1, wherein the flexible member is of a material having a greater linear expansion coefficient than the first base plate and the second base plate, and the flexible member is held between the first and second base plates as being tensed by thermal stress which is created by bonding the flexible member to the first and second base plates at a temperature higher than room temperature with a thermosetting adhesive having a curing temperature higher than room temperature.

4. A deformable mirror of claim 1, wherein a space defined between the first base plate and the second base plate is vacuum with the flexible member held between the first base plate and the second base plate, so that the flexible member is firmly fitted with the first and second base plates by atmospheric pressure.

5. A deformable mirror of claim 1, wherein the flexible member has a glass joint face and a metal joint face on opposite surfaces thereof, the first base plate has a metal joint face on a surface thereof opposed to the glass joint face of the flexible member, and the second base plate has a glass joint face on a surface thereof opposed to the metal joint face of the flexible member, and wherein the flexible member is held between the first base plate and the second base plate with the glass joint faces anodically bonded to the corresponding metal joint faces by application of a voltage therebetween.

6. A deformable mirror of claim 1, wherein the flexible member has a first electrode and at least one of the first base plate and the second base plate has a second electrode formed on a surface thereof opposed to the flexible member, wherein the driver includes a power source for constantly applying a voltage to the first electrode and a control power source for applying a voltage to the second electrode, the voltage to be applied to the second electrode having a polarity same as or different from that of the voltage to be applied to the first electrode, and wherein the flexible member is fitted on the first reference surface of the first base plate or on the second reference surface of the second base plate by an electrostatic force which is generated by controlling the application of the voltage to the second electrode by the control power source.

7. A deformable mirror of claim 1, wherein the flexible member is of a resiliently deformable magnetic material, and the first base plate and the second base plate are respectively provided with magnetic coils, wherein the driver includes a power source for energizing the magnetic coils, and wherein the flexible member is fitted on the first reference surface of the first base plate or on the second reference surface of the second base plate by an electromagnetic force which is generated by either one of the magnetic coils energized by the power source.

8. A deformable mirror of claim 1, wherein the first base plate has a through-hole formed therein, wherein the driver includes a pump capable of sucking or compressing air and connected to the through-hole through a connection pipe, and wherein the flexible member is fitted on the first reference surface of the first base plate or on the second reference surface of the second base plate by air suction or air compression by the pump.

9. A deformable mirror of claim 1, wherein the flexible member has a groove formed in a surface thereof opposed to the first base plate and communicating with the outside of the deformable mirror to prevent air from being trapped between the flexible member and the first reference surface of the first base plate when the flexible member is fitted on the first reference surface.

10. A deformable mirror of claim 1, wherein the flexible member has a plurality of minute vent holes formed therein to prevent air from being trapped between the flexible member and the first reference surface of the first base plate or between the flexible member and the second reference surface of the second base plate when the flexible member is fitted on the first reference surface or on the second reference surface.

11. A deformable mirror of claim 1, wherein the first base plate has a groove formed in the first reference surface thereof to prevent air from being trapped between the flexible member and the first reference surface of the first base plate when the flexible member is fitted on the first reference surface.

12. A deformable mirror of claim 1, wherein the first base plate has a through-hole formed therein and communicating with the outside of the deformable mirror to prevent air from being trapped between the flexible member and the first reference surface of the first base plate when the flexible member is fitted on the first reference surface.

13. An optical data reproducing apparatus comprising:

a light source;

an aberration corrector for reflecting light rays from the light source to impart the light rays with a predetermined spherical aberration;

a condenser for focusing the light rays reflected by the aberration corrector on an optical disk;

a light detector for detecting the light rays reflected from the optical disk;

a signal processor for processing the detected light rays as optical signals;

a disk detector for sensing the type of the optical disk and outputting a detection signal indicative of the type of the optical disk; and a controller for receiving the detection signal indicative of the type of the optical disk from the disk detector, the aberration corrector including a deformable mirror as recited in claim 1, the controller being adapted to control the driver of the deformable mirror in accordance with the detection signal from the disk detector thereby to impart the light rays from the light source with the spherical aberration in accordance with the type of the optical disk.

* * * * *